US010962750B2

(12) United States Patent
Takano et al.

(10) Patent No.: US 10,962,750 B2
(45) Date of Patent: *Mar. 30, 2021

(54) PROJECTION OPTICAL SYSTEM, PROJECTION APPARATUS, AND PROJECTION SYSTEM

(71) Applicant: Ricoh Company, Ltd., Tokyo (JP)

(72) Inventors: Yohei Takano, Iwate (JP); Hibiki Tatsuno, Kanagawa (JP); Yasuyuki Shibayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,800

(22) Filed: Mar. 4, 2020

(65) Prior Publication Data

US 2020/0201008 A1 Jun. 25, 2020

Related U.S. Application Data

(63) Continuation of application No. 16/270,164, filed on Feb. 7, 2019, now Pat. No. 10,585,269, which is a (Continued)

(30) Foreign Application Priority Data

Aug. 27, 2015 (JP) ................................. 2015-168052

(51) Int. Cl.
G03B 21/14 (2006.01)
G02B 15/20 (2006.01)
(Continued)

(52) U.S. Cl.
CPC ............ G02B 15/20 (2013.01); G02B 7/021 (2013.01); G02B 13/16 (2013.01); G02B 17/00 (2013.01);
(Continued)

(58) Field of Classification Search
CPC .. G03B 21/28; G03B 21/142; G03B 21/2053; G02B 15/15; G02B 15/17; G02B 15/22;
(Continued)

(56) References Cited

U.S. PATENT DOCUMENTS 8,503,098 B2 * 8/2013 Sado .................... G03B 21/142
359/686
9,678,412 B2 * 6/2017 Imai ....................... G02B 13/22
(Continued)

FOREIGN PATENT DOCUMENTS

JP 7-181364 A 7/1995
JP 2004-94171 A 3/2004
(Continued)

OTHER PUBLICATIONS

U.S. Appl. No. 15/132,704, filed Apr. 19, 2016.
Japanese Office Action dated May 14, 2019 in Patent Application No. 2015-168052, 4 pages.

Primary Examiner — Sultan Chowdhury
(74) Attorney, Agent, or Firm — Oblon, McClelland, Maier & Neustadt, L.L.P.

(57) ABSTRACT

An optical system includes a reflective optical system on a magnification side along an optical path of the projection optical system and a refractive optical system on a reduction side along the optical path. The reflective optical system includes one reflective optical element having a power. The refractive optical system includes a front group on the magnification side and a rear group on the reduction side. The front group having, in order from the magnification side toward the reduction side, a first lens group with a positive or negative refractive power, a second lens group, and a third lens group with a positive refractive power. The rear group has a positive refractive power. The first lens group moves to the magnification side, and the second lens group and the (Continued)

third lens group move to the reduction side in a change in focus from a long distance to a short distance.

16 Claims, 15 Drawing Sheets

Related U.S. Application Data continuation of application No. 15/822,036, filed on Nov. 24, 2017, now Pat. No. 10,228,546, which is a continuation of application No. 15/230,816, filed on Aug. 8, 2016, now Pat. No. 9,864,177.

(51) Int. Cl.
*G02B 13/16* (2006.01)
*G02B 17/00* (2006.01)
*G02B 7/02* (2021.01)
*G02B 17/08* (2006.01)
*G03B 21/28* (2006.01)

(52) U.S. Cl.
CPC ......... *G02B 17/08* (2013.01); *G02B 17/0852* (2013.01); *G02B 17/0896* (2013.01); *G03B 21/142* (2013.01); *G03B 21/28* (2013.01)

(58) Field of Classification Search
CPC .. G02B 15/161; G02B 15/163; G02B 15/173; G02B 15/177
See application file for complete search history.

(56) References Cited

U.S. PATENT DOCUMENTS

| | | | |
|---|---|---|---|
| 2002/0154276 A1 | 10/2002 | Narimatsu et al. |
| 2006/0044795 A1 | 3/2006 | Tatsuno |
| 2007/0091456 A1 | 4/2007 | Yamamoto |
| 2008/0112064 A1 | 5/2008 | Ishii |
| 2009/0066919 A1 | 3/2009 | Fujita |
| 2009/0086321 A1 | 4/2009 | Mizuguchi |
| 2011/0002048 A1 | 1/2011 | Takano et al. |
| 2012/0154768 A1 | 6/2012 | Tatsuno |
| 2012/0162753 A1 | 6/2012 | Tatsuno |
| 2012/0236419 A1 | 9/2012 | Atsuumi et al. |
| 2012/0307375 A1 | 12/2012 | Takano et al. |
| 2013/0033759 A1 | 2/2013 | Takano et al. |
| 2013/0044294 A1 | 2/2013 | Shibayama et al. |
| 2013/0070217 A1 | 3/2013 | Tatsuno |
| 2013/0107166 A1 | 5/2013 | Osaka et al. |
| 2013/0107232 A1 | 5/2013 | Tatsuno |
| 2013/0107233 A1 | 5/2013 | Hirakawa et al. |
| 2013/0107234 A1 | 5/2013 | Nishina et al. |
| 2013/0114053 A1 | 5/2013 | Tatsuno et al. |
| 2013/0135751 A1 | 5/2013 | Atsuumi et al. |
| 2013/0222922 A1 | 8/2013 | Atsuumi et al. |
| 2013/0235356 A1 | 9/2013 | Takahashi et al. |
| 2014/0022518 A1 | 1/2014 | Amano |
| 2014/0118818 A1 | 5/2014 | Nishina et al. |
| 2014/0126045 A1 | 5/2014 | Tatsuno et al. |
| 2014/0146295 A1 | 5/2014 | Tatsuno |
| 2014/0185145 A1 | 7/2014 | Takano et al. |
| 2014/0218699 A1 | 8/2014 | Tatsuno |
| 2014/0268073 A1 | 9/2014 | Takano |
| 2014/0340654 A1 | 11/2014 | Kuwata |
| 2014/0340658 A1 | 11/2014 | Takano et al. |
| 2015/0029474 A1 | 1/2015 | Tatsuno |
| 2015/0062696 A1 | 3/2015 | Tatsuno et al. |
| 2015/0077725 A1 | 3/2015 | Shibayama |
| 2015/0138518 A1 | 5/2015 | Tatsuno |
| 2015/0138625 A1 | 5/2015 | Tatsuno |
| 2015/0234158 A1 | 8/2015 | Tatsuno et al. |
| 2015/0234159 A1 | 8/2015 | Nagahara |
| 2015/0293434 A1 | 10/2015 | Matsuo |
| 2015/0346464 A1 | 12/2015 | Imai |
| 2015/0370048 A1 | 12/2015 | Takano |
| 2016/0077420 A1 | 3/2016 | Tatsuno |
| 2016/0091700 A1 | 3/2016 | Takano |
| 2016/0103304 A1 | 4/2016 | Takano et al. |

FOREIGN PATENT DOCUMENTS

| | | |
|---|---|---|
| JP | 2007-079524 | 3/2007 |
| JP | 2009-216883 | 9/2009 |
| JP | 2009-251458 | 10/2009 |
| JP | 2010-262226 A | 11/2010 |
| JP | 2011-242606 | 12/2011 |
| JP | 2012-168482 A | 9/2012 |
| JP | 2014-170127 A | 9/2014 |
| JP | 2014-228576 A | 12/2014 |

\* cited by examiner

PROJECTION OPTICAL SYSTEM, PROJECTION APPARATUS, AND PROJECTION SYSTEM

CROSS-REFERENCE TO RELATED APPLICATION

This patent application is a continuation application of U.S. application Ser. No. 16/270,164, filed Feb. 7, 2019, which is a continuation application of U.S. application Ser. No. 15/822,036, filed Nov. 24, 2017 (now U.S. Pat. No. 10,228,546), which is a continuation application of U.S. application Ser. No. 15/230,816, filed Aug. 8, 2016 (now U.S. Pat. No. 9,864,177) and claims priority pursuant to 35 U.S.C. § 119(a) to Japanese Patent Application No. 2015-168052, filed on Aug. 27, 2015, in the Japan Patent Office. The entire contents of the above-identified applications are incorporated herein by reference.

BACKGROUND

Technical Field

Exemplary aspects of the present disclosure generally relate to a projection optical system, and a projection apparatus including the projection optical system, and a projection system including the projection apparatus.

Related Art

A projection apparatus, which may be implemented as any type of projector, enlarges and projects an image displayed on an image display element onto a projection surface, such as a screen. Such a projection apparatus is hereinafter referred to as a "projector".

The image display element, which is a digital micro mirror device (DMD) or any type of liquid crystal panel, allows the image to be displayed as an arrangement of pixels. The image display element has a surface referred to as an "image display surface", on which an image is displayed.

A projection optical system forms, on the projection surface, an enlarged image of the image displayed on the image display element. As such a projection optical system, there is known a projection optical system incorporating a refractive optical system including a lens system and a reflective optical element having a power. This type of projection optical system has a reduced projection distance between a projection apparatus and a projection surface, thereby allowing projection with an ultra-short projection distance.

In typical projection apparatuses, an image enlarged and projected onto a projection surface changes in size with projection distance. In this case, focusing is performed to bring the image to be enlarged and projected onto the projection surface into focus, according to the projection distance changed.

As the focusing techniques, there has been known any type of floating focusing technique, in which the optical elements constituting a projection optical system separately displace.

SUMMARY

In an aspect of this disclosure there is provided a projection optical system to enlarge and project an image displayed on an image display element onto a projection surface. The projection optical system includes a reflective optical system on a magnification side along an optical path of the projection optical system, and a refractive optical system on a reduction side along the optical path. The reflective optical system includes at least one reflective optical element having a power. The refractive optical system includes a front group on the magnification side, and a rear group on the reduction side. The front group having, in order from the magnification side toward the reduction side, a first lens group with a positive or negative refractive power, a second lens group with a negative refractive power, and a third lens group with a positive refractive power. The rear group has a positive refractive power. The first lens group moves to the magnification side, and the second lens group and the third lens group move to the reduction side in a change in focus from a long distance to a short distance.

In another aspect of this disclosure there is provided an improved projection apparatus including an image display device including an image display element; a projection optical system to enlarge and project an image displayed on the image display element of the image display device onto a projection surface; and a lens holding device to hold a refractive optical system to perform focusing. The projection optical system includes a reflective optical system on a magnification side, and the refractive optical system on a reduction side along a projection optical path. The refractive optical system includes a front group on the magnification side, and a rear group on the reduction side. The front group has, in order from the magnification side toward the reduction side, a first lens group with a positive or negative refractive power; a second lens group with a negative refractive power; and a third lens group with a positive refractive power. The rear group has a positive refractive power. The first lens group moves to the magnification side, and the second lens group and the third lens group move to the reduction side in a change in focus from a long distance to a short distance.

Further described are an improved projection system including the projection apparatus described above, and a screen to display an enlarged and projected image, in which conditional formula (3) is satisfied:

$$TR<0.30, \qquad (3)$$

where TR is a ratio of the distance from a point of the refractive optical element having a power intersecting with the optical axis of the refractive optical system to the screen in a direction perpendicular to the screen, with respect to the width of the screen.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
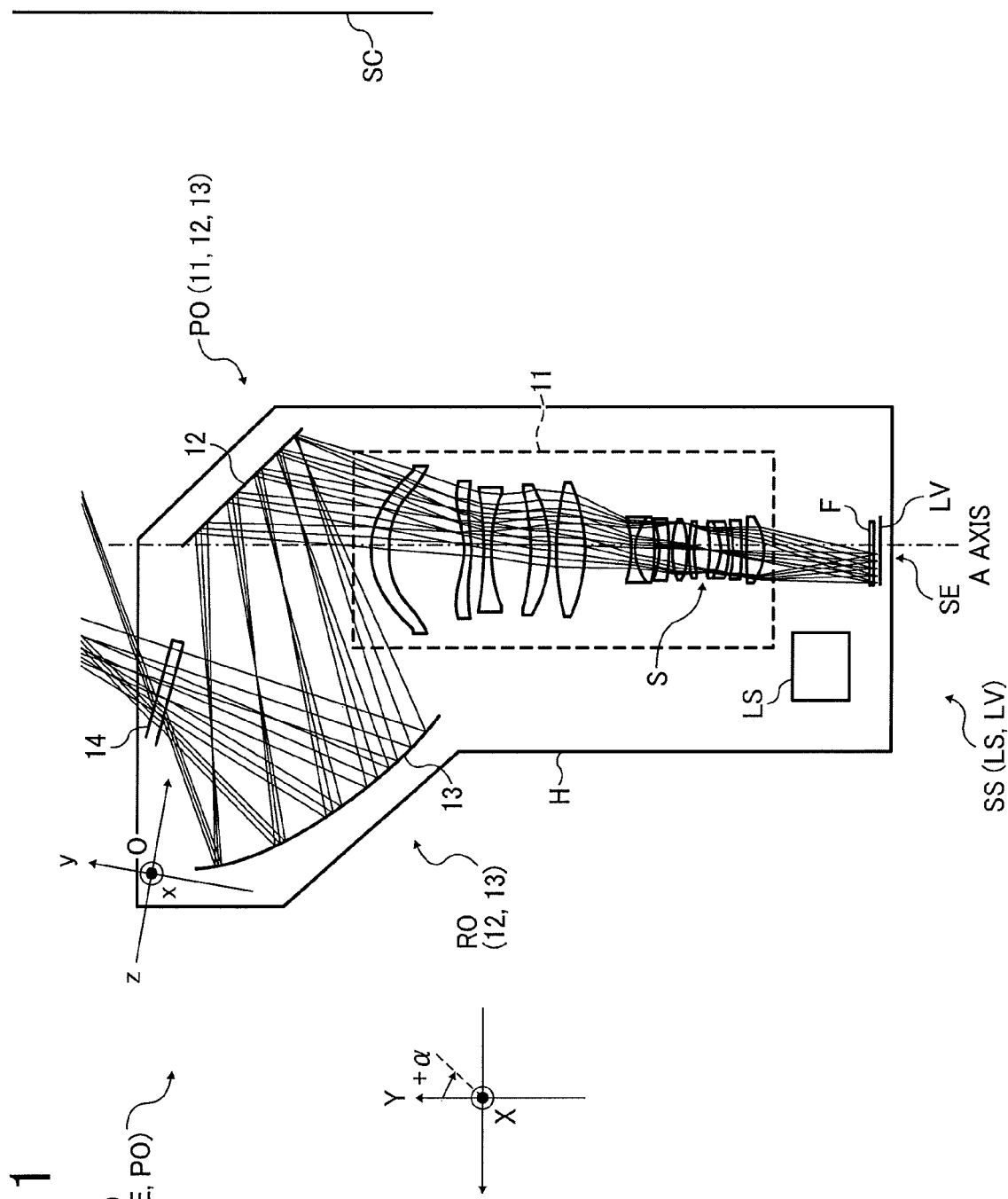
FIG. 1 is an illustration of a projection apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

A description is provided of embodiments of the present disclosure below.

FIG. 1 is an illustration of a projection apparatus PD according to a first embodiment of the present disclosure.

The illumination optical system LS and the image display element SE including the image display surface LV constitute an image display device SS in the present embodiment.

The image display surface LV allows an image to be projected to be displayed.

In the example of FIG. 1, the image display surface LV of the image display element is covered with a transparent parallel planar plate F, which is hereinafter referred to as a "cover glass F". That is, the image display surface LV of the image display element is protected by the cover glass F.

According to the embodiment of FIG. 1, a digital mirror device (DMD) is presumed as the image display element. In this case, micro mirrors, which are two dimensionally arranged in the image display surface LV, are separately tilted, thereby allowing the display of the "image to be projected".

With the DMD as the image display element failing to have self-luminous property, the illumination optical system LS illuminates the image displayed on the image display surface LV. The light rays emitted from the illumination optical system LS are reflected from the micro mirrors, and the intensity of the light rays is modulated to become image light rays that constitute the image.

It is to be noted that the image display element is not limited to the DMD, and various types of liquid crystal panels are applicable as appropriate.

According to the present embodiment, the illumination optical system LS is employed because the image display element is the DMD, which is not self-luminous. However, with another type of image display element SE, such as a light emitting diode (LED) array, having the self-luminous property, the illumination optical system LS is not employed. In this case, only the image display element SE having the self-luminous property constitutes the image display device SS.

Preferably, the illumination optical system LS effectively illuminates the image display surface LV. Further preferably, the use of a rod integrator or a fly-eye integrator equalizes the intensity distribution of light rays better.

As a light source of the illumination optical system LS, a white light source, such as an ultra-high pressure mercury lamp, a xenon lamp, a halogen lamp, and light emitting diode (LED), and monochromatic light source, such as a monochromatic LED, and a laser diode (LD) may be used.

In FIG. 1, a refractive optical system 11, which is also referred to as a lens system, a planar mirror 12, and a concave mirror 13 constitute a projection optical system PO. The A axis in FIG. 1 is an optical axis of the refractive optical system 11. Hereinafter, the optical axis is also referred to simply as the A axis. The planar mirror 12 and the concave mirror 13 constitute a reflective optical system RO according to Example 1 illustrated in FIG. 1.

The image light rays, which have been emitted from the illumination optical system LS, are reflected by the image on the image display surface LV so that the intensity of the image light rays has been modulated. The modulated image light rays pass through the refractive optical system 11 and are sequentially reflected by the planar mirror 12 and the concave mirror 13.

The image light rays having been reflected by the concave mirror 13 become image-forming light rays. The image-forming light rays penetrate through the dust-proof glass 14, thereby becoming image-forming light rays, which are then projected onto a screen SC as the projection surface.

The image display element SE, the image display device SS including the image display element SE and the illumination optical system LS, the projection optical system PO (11, 12, and 13), and the dust-proof glass 14 are incorporated in a housing H.

The image light rays pass through the refractive optical system 11, and are sequentially reflected by the planar mirror 12 and the concave mirror 13 of the reflective optical system RO. The reflected light rays become the image-forming light rays, advancing to the dust-proof glass 14, and to the screen SC. The optical path of the image light rays and the image-forming light rays ranging from the image display surface LV to the screen SC is referred to as a projection optical path. The image display surface LV is on the reduction side of the projection optical path. The screen SC is on the magnification side of the projection optical path.

That is, the projection optical system PO (11, 12, and 13) includes the reflective optical system RO (12 and 13) on the magnification side, and the refractive optical system 11 on the reduction side along the projection optical path. The reflective optical system RO includes at least one reflective optical element 12 or 13 having a power. According to the present embodiment, the concave mirror 13 of the constituent elements (the planar mirror 12 and the concave mirror 13) of the reflective optical element has a positive power.

According to the present embodiment, the refractive optical system 11 forms, as an intermediate image, a conjugate image of an image formed on the image display surface LV, between the planar mirror 12 and the concave mirror 13 along the projection optical path.

The intermediate image is then enlarged and projected onto the screen SC by the positive power of the concave mirror 13. According to another embodiment, the intermediate image is formed into another shape other than a planar image. Further, according to another embodiment, the intermediate image may be formed at a position between the refractive optical system 11 and the concave mirror 13, not between the planar mirror 12 and the concave mirror 13 along the projection optical path.

The refractive optical system 11 includes a front group FG on the magnification side and a "rear group" RG on the reduction side along the projection optical path. A detailed description is given later of the refractive optical system 11.

As described later, the front group FG of the refractive optical system 11 includes, in order from the magnification side to the reduction side, a first lens group I, a second lens group II, and a third lens group III. Among the three lens groups, the second lens group has a negative refractive power. The third lens group has a positive refractive power. The first lens group may have any one of the positive power and the negative power. The "rear group" RG, which is disposed on the reduction side, has a positive power.

The refractive optical system 11, which forms the intermediate image of the image on the image display surface LV as an actual image, has a positive refractive power as a whole.

The first lens group I through the third lens group III that constitutes the rear group RG of the refractive optical system 11 are lenses with respect to focusing. The first lens group I moves toward the magnification side, the second lens group II and the third lens group III move toward the reduction side, thereby focusing from a long distance to a short distance area. The first lens group through the third lens group, which move in a change in focusing, are referred to also as focusing group.

The first lens group through the third lens group move in the manner as described above to change the state, in which the refractive optical system 11 is focused to a long distance with a long projection distance and a large projection image, to the state, in which the refractive optical system 11 is focused to a short distance with a short projection distance and a small projection image. As described above, the projection optical system (11, 12, and 13) performs focusing, using the floating focusing technique.

The refractive optical system 11 is held by a "lens holding device HD" to be describe later. The lens holding device HD holds the refractive optical system 11, allowing the movement of the focusing group.

As described above, the projection apparatus PD of FIG. 1 includes the image display device SS, the projection optical system PO (11, 12, and 13), and the lens holding device HD. The image display device SS includes the image display element SE. The projection optical system PO enlarges and projects an image displayed on the image display element SE of the image display device SS onto the projection surface SC.

The projection optical system PO (11, 12, and 13) includes the reflective optical system RO (12 and 13) on the magnification side and the refractive optical system 11 on the reduction side along the projection optical path. The reflective optical system RO (12 and 13) includes at least one reflective optical element 13 having a power.

The refractive optical system 11 includes the front group FG on the magnification side and the rear group RG on the reduction side. The front group FG includes, in order from the magnification side toward the reduction side, the first lens group I having a positive or negative refractive power, the second lens group II having a negative refractive power, and the third lens group III having a positive refractive power. The rear group RG has a positive refractive power.

The first lens group I moves toward the magnification side, and the second lens group II and the third lens group III move toward the reduction side, thereby "focusing from a long distance to a short distance".

The refractive optical system 11 is held by a lens holding device HD, thereby allowing focusing.

The refractive optical system 11 preferably satisfies conditional formula (1):

$$-0.20 < F2/F3 < -0.5, \qquad (1)$$

where, F2 (<0) is the focal length of the second lens group II, and F3 (>0) is the focal length of the third lens group III in the front group FG.

Reducing the value of F2/F3 in conditional formula (1) means that the negative refractive power of the second lens group II relatively increases. With an increase in negative power of the second lens group II, the amount of movement of the second lens group II with changes in focus decreases.

Accordingly, with a smaller value of F2/F3, the amount of movement, i.e., space for movement, of the focusing group (I, II, and III) decreases, thereby reducing the size of the refractive optical system 11 as well as the projection optical system PO (11, 12, and 13). However, with the value of F2/F3 falling below the lower limit defined by conditional formula (1), the negative power of the second lens group II excessively increases, which easily increases the sensitivity of manufacturing error.

With the value of F2/F3 exceeding the upper limit defined by conditional formula (1), the amount of movement (the space for movement) of the focusing group I, II, and III easily increases, thereby hampering the reduction in the size of the projection optical system PO (11, 12, and 13). Therefore, satisfying conditional formula (1) eliminates or reduces an increase in both the size and the sensitivity of manufacturing error of the projection optical system PO (11, 12, and 13).

More preferably, the refractive optical system 11 satisfies conditional formula (1A):

$$-0.25 < F2/F3 < -0.3. \qquad (1A)$$

The rear group RG of the refractive optical system 11 may have a part of the focusing function, to move with changes in focus. However, with the rear group RG fixed during changes in focus, a focusing device to perform focusing is simplified, thus reducing the size of the lens holding device HD to hold the refractive optical system 11.

Among the first lens group I through the third lens group III that constitute the front group FG, each of the first lens group I and the third lens group III includes one lens.

With each of the first lens group I and the third lens group III including one lens, the range of movement of each of the first lens group I and the third lens group III is easily secured, which contributes to the reduction in size of the refractive optical system 11 and the projection optical system PO (11, 12, and 13) and an increase in performance.

The rear group RG may have any type of configuration. According to one embodiment of the present disclosure, the rear group RG has a two-lens configuration, in which a fourth lens group IV is disposed on the magnification side and a fifth lens group V is disposed on the reduction side. In this case, the projection optical system PO (11, 12, and 13) and the focusing device are simplified, thereby facilitating the reduction in size of the projection optical system PO (11, 12, and 13).

The rear group RG includes a plurality of lenses. The plurality of lenses that constitute the rear group RG are divided into two lens groups at a point, at which the difference of the outer diameters of adjacent lenses is greatest. In this case, the outer diameter of one lens disposed on the magnification side is greater than the outer diameter of the other lens disposed on the reduction side.

Thus, with the configuration of the rear group RG including the fourth lens group IV on the magnification side and the fifth lens group V on the reduction side, the difference in outer diameter of lens is greatest at a position between the fourth lens group IV and the fifth lens group V.

The reflective optical system RO (12 and 13) disposed on the magnification side in the projection optical system PO (11, 12, and 13) includes two reflectors of the planar mirror 12 and the concave mirror 13 as illustrated in FIG. 1. However, the reflective optical system RO is not limited to such a configuration, and may include only one concave mirror in some embodiments. Alternatively, the reflective optical system RO includes three or more reflective optical elements in some embodiments.

With the reflective optical system RO including only one reflective optical element having a power, cost reduction for the reflective optical system RO is achieved.

As in FIG. 1, with two reflective optical elements 12 and 13 in the reflective optical system RO, the projection optical system PO is reduced in size along the direction of the optical axis (A axis) of the refractive optical system 11.

The reflective optical system RO includes at least one reflective optical element 12 or 13 having a power, and accordingly the reflective optical system RO may two or more reflective optical elements having powers.

The reflective optical element having a power is preferably a concave mirror having a free-form surface.

With such a concave mirror having a free-form surface in the reflective optical system RO, various aberration of an image enlarged and projected onto the projection surface (screen SC) are successfully corrected, thereby providing a projection image with high quality.

The projection optical system PO according to the present embodiment preferably satisfies conditional formula (2):

$$10 < F1/FL < 80, \quad (2)$$

where FL is the focal length of the refractive optical system 11, and F1 is the focal length of the first lens group I when an enlarged and projected image is largest, that is, the projection distance is longest. With conditional formula (2) satisfied by the projection optical system PO, the first lens group I has a positive refractive power.

With an increase in value of F1/FL in conditional formula (2), the positive refractive power of the first lens group I decreases, thereby easily increasing the amount of movement of the first lens group I with changes in focus. With the longest projection distance (the projection optical system PO is focused to a long distance), in which the projected image has the largest size, the first lens group I is disposed at the most-reduction side. The first lens group I moves toward the magnification side with a change in focus to a short distance.

Thus, to prevent mechanical interference between the reflective optical element 12 or 13 of the reflective optical system RO and the first lens group I and optical interference between the first lens group I and the reflected light from the reflective optical element 12 or 13, the first lens group is sufficiently spaced apart from the reflective optical element 12 or 13. With the value of F1/FL exceeding the upper limit defined by conditional formula (2), the range (amount) of movement of the first lens group I with changes in focus excessively increases, which induces an increase in size of the projection optical system PO to prevent the mechanical interference and optical interference.

With a reduction in value of F1/FL, the refractive power of the first lens group I increases, thereby reducing the amount of movement of the first lens group I with changes in focus. However, with the value of F1/FL falling below the lower limit defined by conditional formula (2), the refractive power of the first lens group I excessively increases, which easily increases the sensitivity of manufacturing error, resulting in the manufacturing of the projection optical system PO being difficult.

The projection optical system PO satisfying conditional formula (2) effectively reduces an increase in size and difficulty in manufacture of the projection optical system PO.

More preferably, the projection optical system PO satisfies conditional formula (2A), the range of which is slightly narrower than conditional formula (2): (2A) $13 < F1/FL < 50$.

It is to be noted that in all of the embodiments of the present disclosure, the projection image is formed by oblique light rays.

In FIG. 1, direction Y and direction Z are perpendicular with each other, and direction X is perpendicular to the drawing sheet within a plane parallel with the drawing sheet. Direction Y is parallel with the A axis (the optical axis of the refractive optical system 11), and direction Z is parallel with the normal line with respect to the screen SC.

Regarding the direction of an angle to be described later, a clockwise direction of an axis parallel with direction X is designated as positive.

The image light rays advancing from the image display surface LV are the oblique light rays, which are oblique relative to the A axis of the refractive optical system 11, being subjected to the optical action of the refractive optical system 11.

Figure 2:
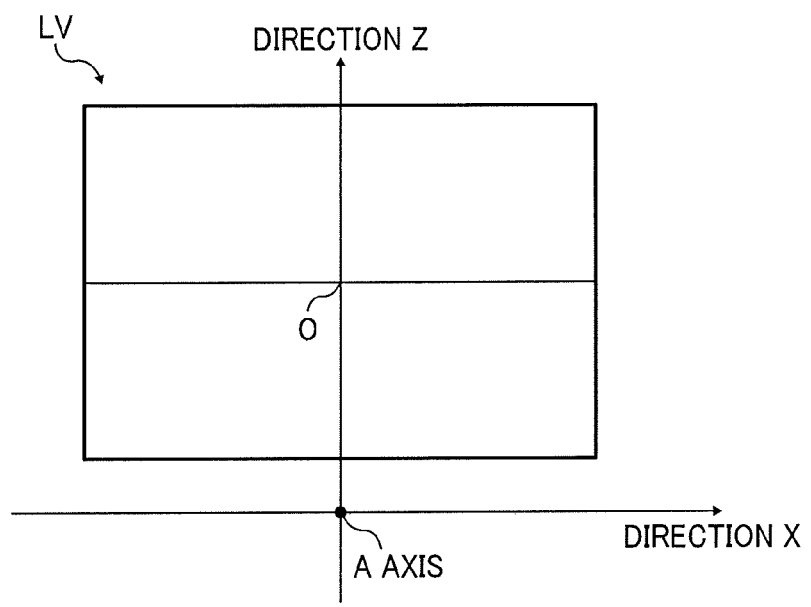
FIG. 2 is an illustration of a position of an image display surface relative to a refractive optical system.

FIG. 2 is an illustration of the relative positions of the image display surface LV and the A axis of the refractive optical system 11. The image display surface LV has a rectangular shape with a longer length in direction X.

As illustrated in FIG. 2, the center O of the image display surface LV is shifted from the A axis toward the positive side in direction Z.

As described above, in the projection optical system PO according to the present embodiment of this disclosure, the intermediate image formed on the image display surface LV is formed at a position between the refractive optical system 11 and the reflective optical element 13 with a power of the reflective optical system RO. The formed intermediate image is enlarged and projected onto the projection surface (screen SC) via the reflective optical element 13 with a power.

The intermediate image changes in magnification with focusing, and accordingly an enlarged image of a size according to the projection distance is formed. In this case, the intermediate image changes in image-forming position with the projection distance. With a great change in the image-forming position of the intermediate image according to the projection distance, the reflective optical element 13 having a power increases in size, thereby increasing the size of the projection optical system PO.

The projection optical system PO according to the present embodiment that adopts the floating focusing technique reduces an increase in amount of movement of the focusing group (the first lens group I through the third lens group III) that move with changes in focus, thus allowing a successful correction of field curvature and distortion of the intermediate image and a reduction in the size of the projection optical system PO.

A detailed description is given below of the projection optical system PO according to Examples 1 and 2. In Examples 1 and 2, an image displayed on the image display surface LV is formed into an intermediate image at a position between the refractive optical system 11 and the concave mirror 13. The concave mirror 13 has an adjustable surface to correct field curvature and distortion of the intermediate image. With field curvature and distortion of the intermediate image corrected by the free-form surface of the concave mirror 13, projection with an ultrashort projection distance is allowed.

The projection apparatus PD of the present disclosure and the screen SC as the projection surface constitute a projection system as a whole. The projection system PS preferably satisfies conditional formula (3) below:

$$TR<0.30, \quad (3)$$

where TR is a ratio of the distance L from a point of the refractive optical element 13 having a power intersecting with the optical axis (A axis) of the refractive optical system 11 to the screen SC in a direction perpendicular to the screen SC, with respect to the width W of the screen SC. That is, TR is a ratio of the distance L to the width W.

The distance L corresponds to the projection distance. With conditional formula (3) satisfied, the distance L is less than 30% of the width W of the screen SC, which means that even with the largest enlarged image, projection with an extremely short projection distance is achieved.

A description is given below of the refractive optical system 11 of the projection optical system PO according to Examples 1 and 2 of the present disclosure, referring to FIGS. 3 and 4.

Figure 3:
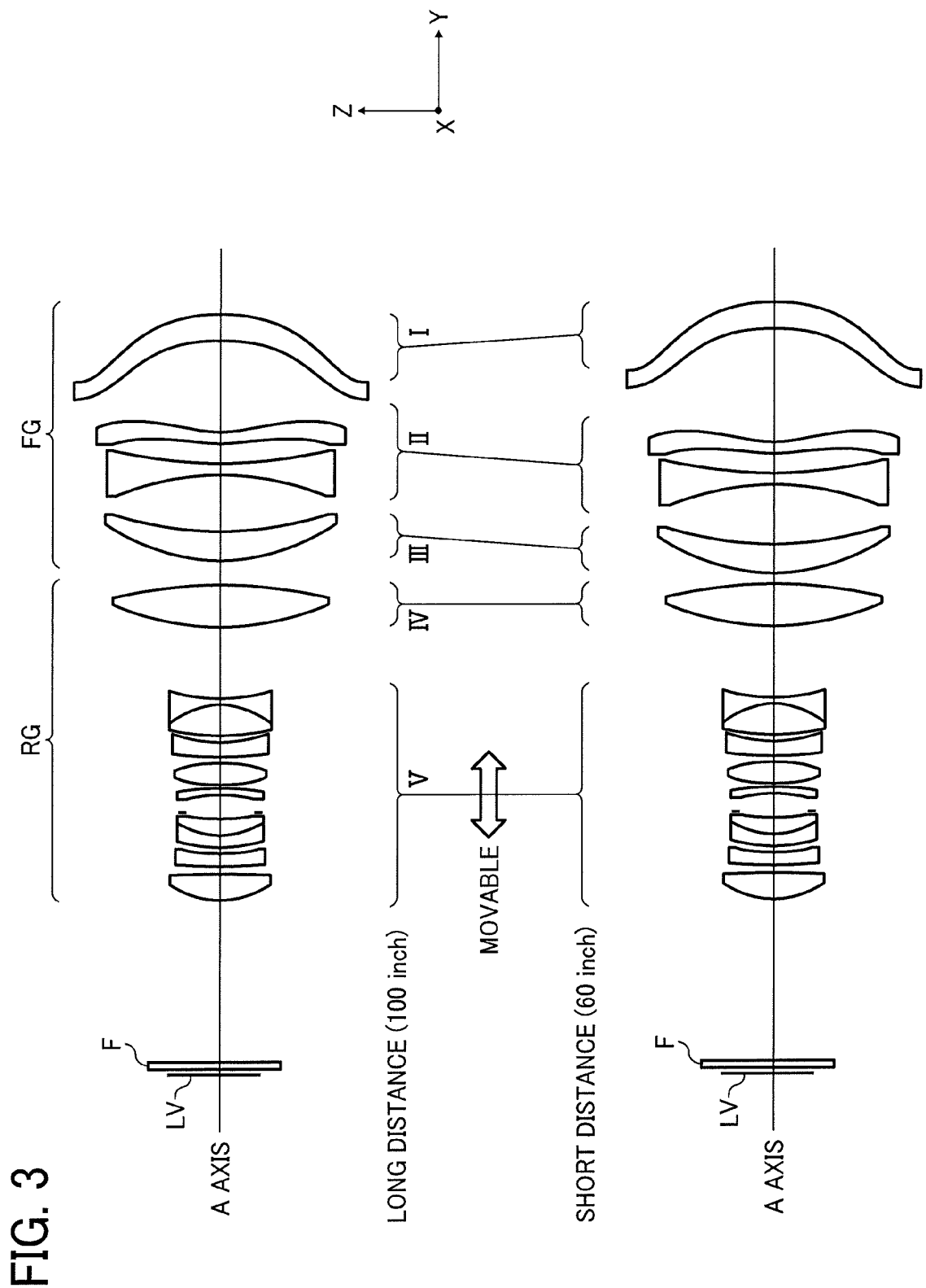
FIG. 3 is an illustration of a refractive optical system according to Example 1.
Figure 4:
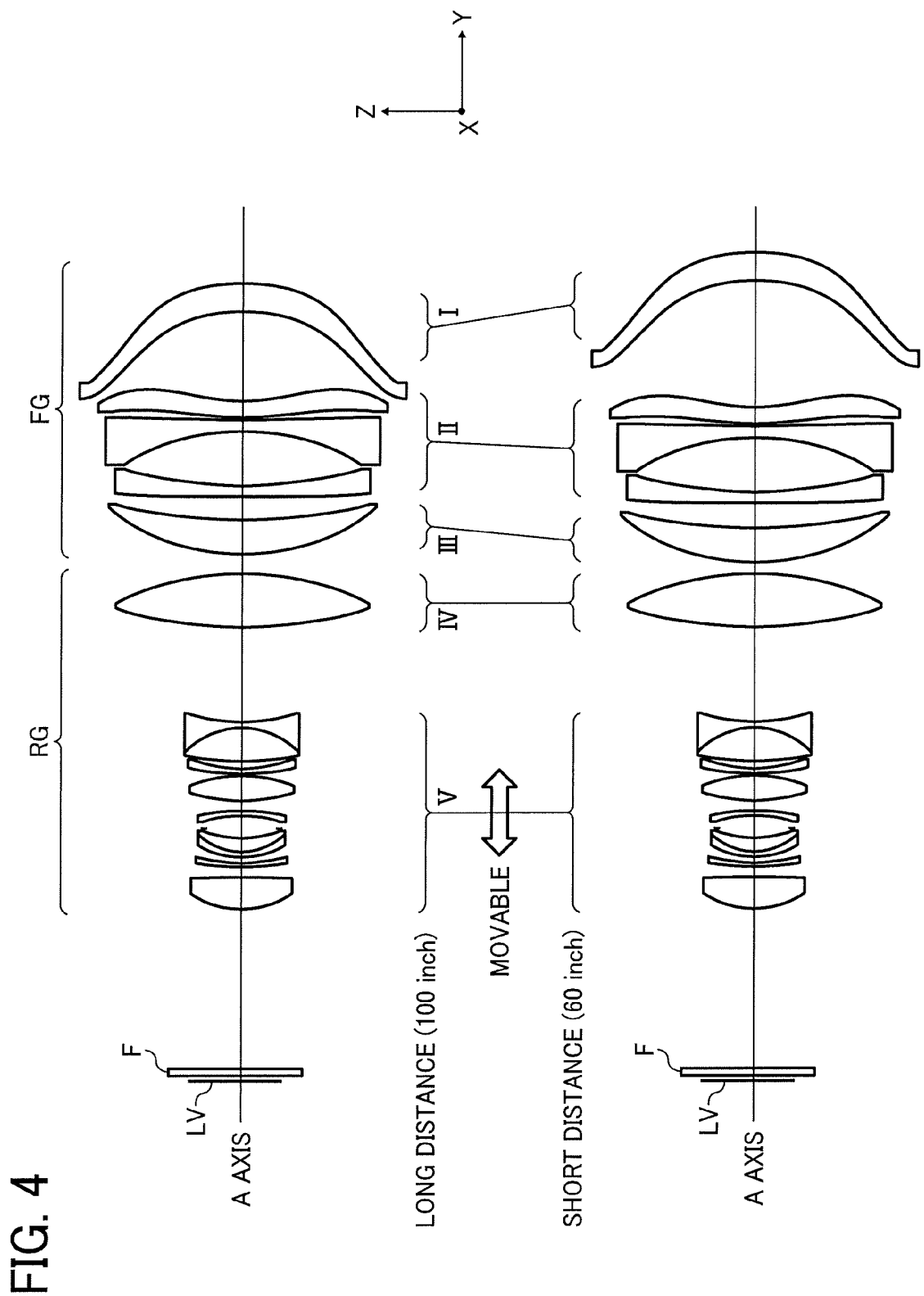
FIG. 4 is an illustration of a refractive optical system according to Example 2.

The refractive optical system 11 illustrated in FIGS. 3 and 4 correspond to the refractive optical system 11 according to Examples 1 and 2, respectively. The same reference signs are given to corresponding elements in FIGS. 3 and 4 to facilitate understanding of elements.

Each of FIGS. 3 and 4 is a sectional view of arrangement of lenses in refractive optical system 11 on the long distance side with the longest projection distance and on the short distance side with the shortest projection distance.

The enlarged image projected onto the projection surface has a diagonal line of 100 inch on the long distance side, and a diagonal line of 60 inch on the short distance side in both Example 1 corresponding to FIG. 3 and Example 2 corresponding to FIG. 4.

In the upper stage and the lower stage of FIGS. 3 and 4, the left side is the magnification side, and the right side is the reduction side. The image display surface LV and the cover glass F are illustrated on the reduction side.

The projection optical system PO of FIGS. 3 and 4 includes five lens groups I, II, III, IV, and V. That is, the projection optical system PO includes, in order from the magnification side to the reduction side, a first lens group I, a second lens group II, a third lens group III, a fourth lens group IV, and a fifth lens group V along the A axis. Among the five lens groups I, II, III, IV, and V, the first lens group I through the third lens group III constitute the focusing group. The first lens group I moves to the magnification side, and the second lens group II and the third lens group III move to the reduction side with changes in focus from a long distance to a short distance.

The first lens group I through the third lens group III of the focusing group constitutes the front group FG.

The fourth lens group IV and the fifth lens group V constitute the "rear group RG".

In FIGS. 3 and 4, the first lens group I has a positive refractive power, and the second lens group II has a negative refractive power. The third lens group III has a positive refractive power, and the fourth lens group IV and the fifth lens group V both have a positive refractive power.

The fourth lens group IV and the fifth lens group V of the rear group RG, which do not belong to the focusing group, do not move (displace) with changes in focus.

In the refractive optical system 11 according to Examples 1 and 2, each of the first lens group I and the third lens group III includes only one positive lens. The second lens group II according to Example 1 of FIG. 3 includes two negative lenses. The second lens group II according to Example 2 of FIG. 4 includes three negative lenses.

In the rear group RG according to Examples 1 and 2, the fourth lens group IV includes one positive lens (biconvex lens), and the fifth lens group V includes nine lenses having a positive or negative refractive power.

The fifth lens group V includes a cemented lens formed by combining a biconcave lens and a biconvex lens on the maximum-magnification side. The lens on the magnification side within the cemented lens is a biconcave lens. The difference in the outer diameter of lens is greatest between the biconcave lens and the fourth lens group IV adjacent to the biconcave lens.

A description is given below of such a configuration of the refractive optical system 11, referring to FIG. 5.

The refractive optical system 11 as illustrated in FIGS. 3 and 4 is combined with the reflective optical system RO to be described below, allowing a reduction in size and the projection with an ultrashort projection distance.

A typical projection optical system with an ultrashort projection distance adopts a configuration that causes the light rays of different angles of view entering the focusing group to separate from each other as much as possible to highly correct the position of the image surface relative to the projection surface.

Figure 5:
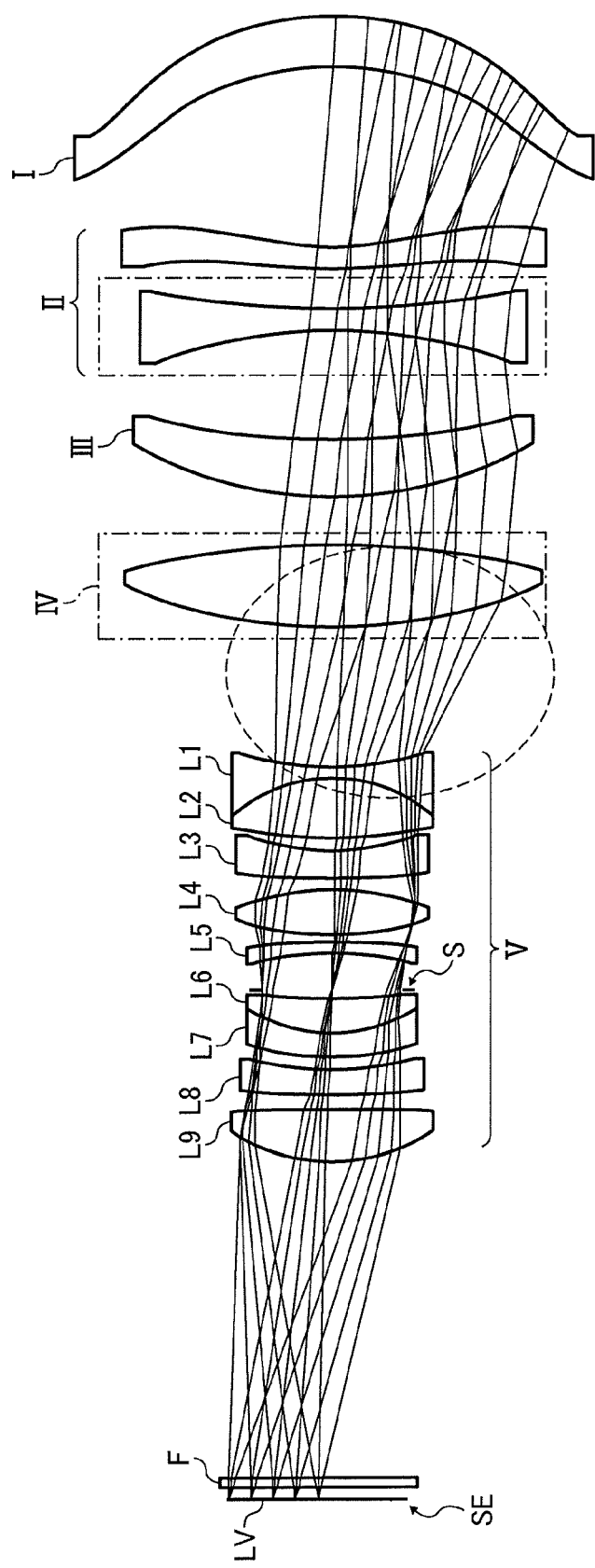
FIG. 5 is an illustration of separation of light rays at different angles of view in the refractive optical system of FIG. 3.

As illustrated in FIG. 5, the "biconcave lens on the maximum-magnification side" within the fifth lens group V causes the individual image light rays having entered the refractive optical system 11 from the image display surface LV and passed through the fifth lens group V, to separate from each other.

The light rays of different angles of view separate from each other and then receive a converging force, entering the focusing group.

That is, the light rays of different angles of view separate from each other at a position, in which the difference in the outer diameter of lens is greatest.

The lens of the fourth lens group IV has an outer diameter greater than each lens within the fifth lens group V, having a high sensitivity for eccentricity of the focusing group (the front group FG).

In such a configuration as illustrated in FIG. 5, the rear group RG is divided into the fourth lens group IV having a high sensitivity for eccentricity of the focusing group and the fifth lens group V having a low sensitivity for eccentricity, thereby reducing an increase in the sensitivity of manufacturing error.

In FIG. 5, among the lenses, particularly the biconvex lens of the fourth lens group IV and the biconcave lens disposed on the reduction side within the second lens group II have a high sensitivity for eccentricity.

Assuming that each lens of the fifth lens group V has an outer diameter of substantially the same length as the outer diameter of lens of the fourth lens group IV, a lens barrel to hold the fifth lens group V increases in size, thereby increasing the size of the refractive optical system 11.

Further, assuming that the fourth lens group IV moves with changes in focus, an image surface is highly corrected, thereby resulting in a complex focusing device and variations of quality of the projection image according to the projection distance.

In the refractive optical system 11 according to Examples 1 and 2 of FIGS. 3 and 4, respectively, with the rear group RG including the fourth lens group IV and the fifth lens group V fixed, the light rays of different angles of view exiting the rear group RG separate from each other at a position, in which the difference in the outer diameter of lens is greatest. Such a configuration prevents an increase in the sensitivity of manufacturing error and the diameter of the lens barrel.

In the refractive optical system 11 according to Examples 1 and 2 of FIGS. 3 and 4, respectively, the positive lens of the first lens group I in the focusing group has a relatively weak refractive power to correct particularly field curvature. The second lens group II having a negative refractive power and the third lens group III having a positive refractive power change the magnification of an image.

The second lens group II and the third lens group III, the refractive powers of which are opposites, move in the same direction, eliminating or reducing the fluctuations in aberration while effectively changing magnification. As a result, the amount of movement of the focusing group decreases, facilitating a reduction in size of the refractive optical system 11.

With a reduction in amount of movement of the focusing group, the interference between the light rays reflected by the reflective optical system RO and the first lens group I is easily avoided, increasing the effective diameter of lenses of the first lens group I disposed on the maximum-magnification side, thus allowing the projection with a shorter projection distance.

With the configuration that causes the light rays of different angles of view to sufficiently separate from each other a position between the fourth lens group IV and the fifth lens group V and that makes the fourth lens group IV and the fifth lens group V fixed during changes in focus, the fluctuations in aberration with changes in focus are effectively eliminated or reduced.

With projection at a short distance, the depth of focus is narrow, in which an image surface is highly corrected. In a change in focus to a short distance, the first lens group I moves to the magnification side, and the second lens group II and the third lens group III move to the reduction side. With the projection optical system PO focused on the range of the short distance, the distance between the first lens group I and the second lens group II increases, thereby allowing the light rays of different angles of view entering the first lens group I to successfully separate from each other, thus allowing advanced correction of the image surface even with the short distance and a reduction in projection distance.

[Specific Examples of Projection Optical System]

A description is given below of the projection optical system PO according to Examples 1 and 2.

A projection optical system PO of Example 1 is the combination of the refractive optical system 11 of FIG. 3 and the reflective optical system RO (the planar mirror 12 and the concave mirror 13). A projection optical system PO of Example 2 is the combination of the refractive optical system 11 of FIG. 4 and the reflective optical system RO (the planar mirror 12 and the concave mirror 13).

The reflective optical system RO includes the planar mirror 12 and the concave mirror 13 as illustrated in FIG. 1 in Examples 1 and 2. The concave mirror 13 has a free-form surface.

The meanings of symbols in Examples 1 and 2 are described below.

R: radius of curvature ("paraxial radius of curvature" for an aspherical surface);

D: distance between surfaces;

Nd: refractive index; and vd: Abbe number.

The refractive optical system 11 includes an aspherical lens with an aspherical surface".

The aspherical surface is defined by mathematical expression (A) below, where the symbol "ξ" denotes the degree of asphericity along the optical axis, the symbol "C" denotes a paraxial curvature, the symbol "H" denotes a height from the optical axis (A axis), the symbol "K" denotes conic constant of an aspherical surface, and the symbol "Ai" denotes an aspherical surface coefficient of the i-th order:

$$\xi = C \cdot h^2 [1 + \sqrt{(1-(1+K)C^2 \cdot h^2)}] + \Sigma Ai \cdot h^i \quad (A)$$

In mathematical expression (A), the sum of the second term in the right side is squared by the order of the aspherical surface.

The "adjustable surface" of the concave mirror 13 is defined by mathematical expression (B) below, using the "local coordinate system (x, y, z)", which is the rectangular system peculiar to the free-form surface. Mathematical expression (B) includes a polynomial expression of the symbols "x" and "y":

$$\eta = C \cdot h^2 [1 + \sqrt{(1-(1+K)C^2 \cdot h^2)}] + \Sigma Cj \cdot x^m y^n \quad (B)$$

In mathematical expression (B), the symbol "η" in the left side denotes the degree of free-form surface in the direction of the axis z in the local coordinate system.

In the left side of mathematical expression (B), the symbol "h" denotes height from the axis z in the local coordinate system. The symbol "C" denotes a paraxial curvature (curvature in the vicinity of an intersection point of the free-form surface and the axis z), and the symbol "K" denotes conic constant. The symbol "Cj" denotes a free-form surface coefficient.

FIG. 1 schematically illustrates the local coordinate system (x, y, z).

In the local coordinate system, the axis x refers to a direction perpendicular to the drawing sheet of FIG. 1, and the axis y refers to a direction perpendicular to the axis x within a plane parallel with FIG. 1.

In mathematical expression (B), each of the symbols "x" and "y" in the second term of the right side is a coordinate at a position of a height (distance) h from the axis z in the local coordinate system. In the local coordinate system of FIG. 1, the coordinate "x" refers to a position in the direction of the axis x perpendicular to the drawing sheet, and the coordinate "y" refers to a position in the direction of the axis y.

In the second term of the right side of mathematical expression (B), the symbol "j" of the free-form surface "Cj" is defined by mathematical expression (B-1), using the exponents "m" and "n" of the coordinate "x" and "y":

$$J=[\{(m+n)2+m+3n\}/2]+1 \tag{B-1}$$

Example 1

A projection optical system PO according to Example 1 includes the refractive optical system 11 of FIG. 3 and the reflective optical system RO including a planar mirror (the planar mirror 12 of FIG. 1) and a concave mirror (the concave mirror 13 of FIG. 1) disposed on the magnification side.

The refractive optical system 11 includes the first lens group I, the second lens group II, the third lens group III, the fourth lens group IV, and the fifth lens group V, as illustrated in FIG. 3.

The first lens group I includes a positive meniscus lens with a convex surface toward the magnification side. The positive meniscus, which is made of resin, has aspherical surfaces on both sides, having a positive refractive power. The second lens group II having a negative refractive power includes, in order from the magnification side, a negative meniscus lens with a convex surface toward the reduction side, and a biconcave lens disposed on the reduction of the negative meniscus lens. The negative meniscus lens, which is made of resin, has aspherical surfaces on both sides. The biconcave lens has a smaller curvature on the reduction side.

The third lens group III having a positive refractive power includes a positive meniscus lens with a convex surface toward the reduction side. The first lens group I, the second lens group II, and the third lens group III constitutes the front group FG of the refractive optical system 11.

The fourth lens group IV, which is disposed on the magnification side of the rear group RG, includes a biconvex lens with a convex surface having a greater curvature on the reduction side.

The fifth lens group V having a positive refractive power includes nine lenses. Hereinafter, the nine lenses are referred to as a first lens L1 through a ninth lens L9 in order from the magnification side.

The first lens L1 is a biconcave lens with a concave surface having a greater curvature on the reduction side. The second lens L2 is a bi convex lens with a convex surface having a greater curvature on the magnification side.

The third lens L3 is a negative meniscus lens with a convex surface toward the reduction side. The fourth lens L4 is a biconvex lens with aspherical surfaces, in which the curvature is greater on the magnification side. The fifth lens L5 is a negative meniscus lens with a convex surface toward the magnification side.

The sixth lens L6 is a positive meniscus lens with a convex surface toward the reduction side. The seventh lens L7 is a negative meniscus lens with a convex surface toward the reduction side. The sixth lens L6 and the seventh lens L7 are combined to form a cemented lens.

The eighth lens L8 is a negative meniscus lens with a convex surface toward the reduction side. The ninth lens L9 is a biconvex lens with aspherical surfaces, in which the curvature is greater on the reduction side.

An aperture stop S is disposed between the fifth lens L5 and the sixth lens L6.

As illustrated in FIG. 1, the refractive optical system 11 includes the planar mirror 12 and the concave mirror 13 on the magnification side. The concave mirror 13 has a free-form surface.

Table 1 indicates data regarding the projection optical system PO according to Example 1.

In Table 1, "Surface Numbers" on the leftmost column represents the number of a surface (including the surface of the aperture stop S) counted from the side of the image display element SE. Surface number "1" refers to the image display surface LV. Surface numbers "2" and "3" refer to both surfaces of the cover glass F. Surface number "4" and following surface numbers refer to the surfaces of the respective lenses in the refractive optical system 11.

The mark "*" is indicated at surface numbers of aspherical surfaces. The mark "**" is indicated at free-form surfaces. The unit of length, which is a dimension, is mm unless otherwise mentioned.

TABLE 1

| Surface Numbers | R | D | Nd | Vd | Glass Materials | Diameters |
|---|---|---|---|---|---|---|
| 1 | ∞ | 1.00 | | | | |
| 2 | ∞ | 1.00 | 1.51633 | 64.1420 | S-BSL7 | OHARA |
| 3 | ∞ | 29.00 | | | | |
| 4* | 16.048 | 4.80 | 1.49700 | 81.5459 | S-FPL51 | OHARA | 10.25 |
| 5* | −85.536 | 1.38 | | | | | 9.95 |
| 6 | 111.624 | 2.27 | 1.74000 | 28.2960 | S-TIH3 | OHARA | 9.6 |
| 7 | 30.383 | 1.18 | | | | | 9.2 |
| 8 | 27.207 | 2.25 | 1.90366 | 31.3150 | TAFD25 | HOYA | 9.1 |
| 9 | 13.755 | 3.12 | 1.53775 | 74.7031 | S-FPM3 | OHARA | 8.6 |
| 10 | 63.887 | 0.82 | | | | | 8.3 |
| Stop | ∞ | 3.42 | | | | | 8.4 |
| 11 | −26.275 | 1.00 | 1.53775 | 74.7031 | S-FPM3 | OHARA | 8.8 |
| 12 | −56.602 | 0.60 | | | | | 9.1 |
| 13* | 24.766 | 4.21 | 1.58913 | 61.1526 | L-BAL35 | OHARA | 9.6 |

TABLE 1-continued

| Surface Numbers | R | D | Nd | Vd | Glass Materials | | Diameters |
|---|---|---|---|---|---|---|---|
| 14* | −21.197 | 0.97 | | | | | 9.9 |
| 15 | 67.443 | 2.66 | 1.80400 | 46.5834 | S-LAH65V | OHARA | 10.0 |
| 16 | 21.739 | 1.10 | | | | | 10.0 |
| 17 | 43.073 | 5.60 | 1.85478 | 24.7990 | S-NBH56 | OHARA | 10.1 |
| 18 | −13.494 | 0.90 | 1.90366 | 31.3150 | TAFD25 | HOYA | 10.2 |
| 19 | 27.364 | 12.92 | | | | | 10.7 |
| 20 | 47.244 | 7.60 | 1.60300 | 65.4436 | S-PHM53 | OHARA | 19.7 |
| 21 | −79.679 | Variable A | | | | | 20.0 |
| 22 | 35.971 | 5.20 | 1.75700 | 47.8232 | S-LAM54 | OHARA | 21.4 |
| 23 | 64.935 | Variable B | | | | | 20.9 |
| 24 | −46.113 | 2.00 | 1.74950 | 35.3325 | S-NBH51 | OHARA | 20.4 |
| 25 | 85.115 | 3.69 | | | | | 21.3 |
| 26* | 44.375 | 2.00 | 1.53046 | 55.8000 | Resin | | 21.8 |
| 27* | 23.826 | Variable C | | | | | 23.0 |
| 28* | −38.342 | 4.80 | 1.53046 | 55.8000 | Resin | | 25.8 |
| 29* | −32.958 | Variable D | | | | | 26.8 |
| 30 | ∞ | −86.21 | Reflection Surface | | | | |
| 31** | ∞ | Variable E | Reflection Surface | | | | |

[Variable Distance]

In the projection optical system PO of Example 1, the size (the length of the diagonal line) of the largest image, which is enlarged and projected with a long projection distance, is 100 inch. The size of the smallest image, which is reduced and projected with a short projection distance, is 60 inch. The size of the reference image, which is projected with a reference position, is 80 inch.

Table 2 represents variable distances with the short distance, reference position, and long distance (Table 1 represents variable A through variable E), as in Table 2. Focusing is to performed with changes in values of variable A through variable E as in Table 2.

TABLE 2

| Screen Size | Short Distance 60 inch | Reference Position 80 inch | Long Distance 100 inch |
|---|---|---|---|
| Variable A | 2.00 | 3.63 | 4.54 |
| Variable B | 10.98 | 10.41 | 10.10 |
| Variable C | 20.43 | 18.06 | 16.64 |
| Variable D | 52.85 | 54.16 | 54.98 |
| Variable E | 344.33 | 446.01 | 547.63 |

Table 3 represents data regarding aspherical surfaces (K denotes conic constant, and Ai denotes aspherical surface coefficient)

TABLE 3

| | K | A4 | A6 | A8 | A10 | A12 | A14 | A16 |
|---|---|---|---|---|---|---|---|---|
| 4th Surface | 0.5845 | −2.6875E−05 | −4.6685E−08 | | | | | |
| 5th Surface | −102.0263 | 2.4705E−05 | 1.3539E−07 | 6.5230E−10 | | | | |
| 13th Surface | −0.2242 | −9.2289E−06 | | | | | | |
| 14th Surface | −0.8331 | 1.9190E−05 | 5.8305E−09 | | | | | |
| 26th Surface | −12.1375 | −3.7845E−05 | −1.9499E−08 | 5.5908E−10 | −1.8734E−12 | 2.3480E−15 | −2.27821E−19 | −1.0808E−21 |
| 27th Surface | −1.7935 | −7.5892E−05 | 1.5352E−07 | −1.4244E−10 | −1.4842E−13 | 3.8953E−16 | −1.70315E−19 | |
| 28th Surface | −0.6513 | −4.8232E−05 | 1.1572E−07 | −5.0227E−10 | 1.8861E−12 | −2.8899E−15 | 1.53542E−18 | |
| 29th Surface | −1.4060 | −3.6199E−05 | 3.1817E−08 | 3.8156E−11 | −6.7693E−13 | 2.9033E−15 | −4.39848E−18 | 2.24094E−21 |

In Table 3, the expression "2.24094E-21" refers to "2.24094×10-21". The same applies to the following Tables.

[Data Regarding Free-Form Surface] Table 4 represents data regarding free-form surface (K is conic constant, and Ai: is aspherical surface coefficient).

TABLE 4

|  | 31th Surface |
|---|---|
| K | 0 |
| C4 | 9.6874E-03 |
| C6 | 2.9464E-03 |
| C8 | 8.1314E-05 |
| C10 | -1.1148E-04 |
| C11 | -6.5274E-07 |
| C13 | 6.2819E-06 |
| C15 | 9.3461E-07 |
| C17 | -3.4747E-08 |
| C19 | 1.4733E-07 |
| C21 | 4.2726E-08 |
| C22 | 8.8158E-11 |
| C26 | 1.0110E-09 |
| C28 | 3.9459E-10 |
| C30 | 6.1707E-13 |
| C32 | -5.3383E-11 |
| C34 | -8.8595E-12 |
| C36 | -1.7197E-13 |
| C37 | -9.1360E-15 |
| C39 | 6.9171E-14 |
| C41 | -6.1544E-13 |
| C43 | -1.1323E-13 |
| C45 | -8.4025E-15 |
| C47 | 1.6700E-16 |
| C49 | 1.9423E-15 |
| C51 | -2.7748E-15 |
| C53 | 3.9039E-16 |
| C55 | 1.6027E-16 |
| C56 | 7.7700E-19 |
| C58 | 3.4642E-18 |
| C60 | 1.4661E-17 |
| C64 | 6.7415E-18 |
| C66 | 1.4757E-18 |

[Position of Planar Mirror and Concave Mirror]

The first lens group I of the front group FG in the projection optical system PO is positioned at the maximum-magnification side with the projection optical system PO focused to a short distance, in which the projection distance is the shortest. Table 5 represents the positions of the planar mirror 12 and the concave mirror 13 with projection optical system PO in such a state. In this case, the position of the magnification-side surface of the first lens group I along the optical axis is designated as the reference position (Y=Z=0).

TABLE 5

|  | axis Z Direction | Axis Y Direction | Tilt: α |
|---|---|---|---|
| 30$^{th}$ Surface | 0.00 | 54.98 | 45.00 |
| 31$^{th}$ Surface | 86.21 | 74.51 | 13.40 |

In Table 5, the 30th surface is a mirror surface of the planar mirror 12. The position of the surface (30th surface) is a point, at which the optical axis (A axis) and the planer mirror 12 intersect with each other. The tilt a is an angle formed by the meeting of the A axis and the normal line at the intersection point of the 30th surface. The angle is measured in the clockwise direction from the A axis side.

The 31th surface is a surface of the concave mirror 13. The position of the 31th surface corresponds to the original position (x=y=z=0) of the local coordinate that represents the free-form surface. The tilt a is the tilt angle of the 31th surface with respect to the axis z.

The tilt angle, which is the angle formed by the meeting of the optical axis of the refractive optical system 11 and the reflection face

[Values of Parameters in Conditional Formulas]

The values of parameters in conditional formulas (1) and (2) are as follows:

In conditional formula (1), the value of F2/F3 is −0.27. In conditional formula (2), the value of F1/FL is 16.11.

[Values of Parameter (TR)]

Table 6 represents the values of TR (the ratio of L to W) in conditional formula (3).

TABLE 6

|  | Short Distance 60 inch | Reference Position 80 inch | Long Distance 100 inch |
|---|---|---|---|
| Projection Distance | 347.33 | 449.01 | 550.63 |
| TR | 0.261 | 0.254 | 0.249 |

Conditional formula (3) is satisfied in any cases that the projection optical system PO is focused to a short distance, that the projection optical system PO is focused on the reference position, and that the projection system PO is focused to a long distance. As in Table 1, the largest enlarged image is formed with an extremely short projection distance.

Table 6-A represents the values of the focal length f of the entire projection optical system PO, and the numerical aperture NA.

TABLE 6-A

|  | Short Distance | Reference Position | Long Distance |
|---|---|---|---|
|  | 20.89 | 21.07 | 21.38 |
| A | 0.200 | 0.200 | 0.200 |

As illustrated in FIG. 2, the size of the image display surface LV of the image display element SE, such as a digital mirror device (DMD), is as follows:

The length in direction X: 14.5152 mm;

The length in direction Z: 8.1648 mm;

Dot size: 7.56 μm; and

Distance from the optical axis (A axis) of the refractive optical system 11 to the center of the image surface: 5.30 mm.

Evaluation results based on the spot diagram is given below of the projection optical system PO according to Example 1.

Figure 6:
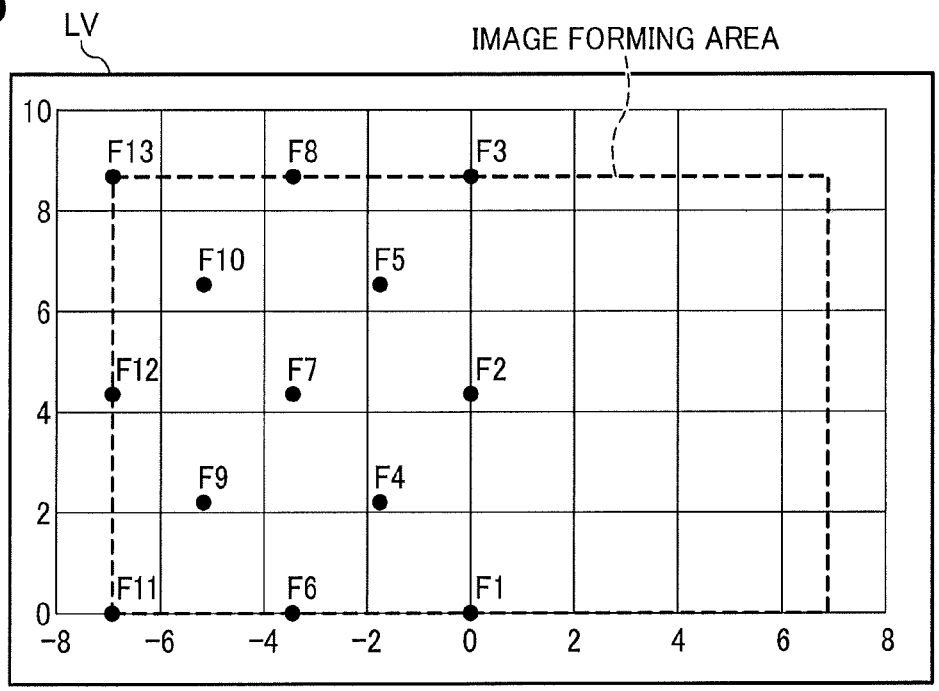
FIG. 6 is an illustration of evaluation positions for evaluating the characteristics of the projection optical system according to an embodiment of the present disclosure.

As illustrated in FIG. 6, the evaluation positions F1 through F13 are set within the image forming area of the image display surface LV. A spot diagram is obtained by tracing the light rays emitted from the evaluation positions F1 through F13.

Figure 7:
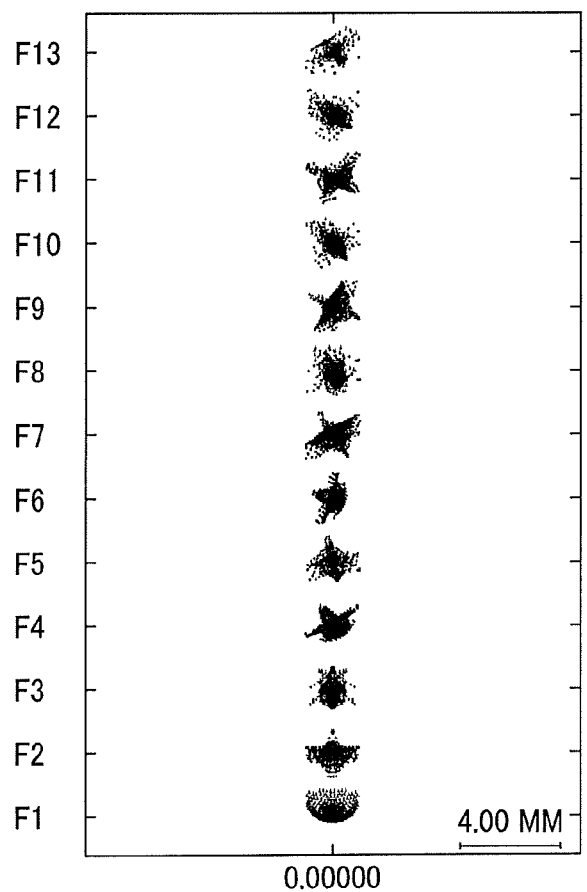
FIG. 7 is a spot diagram of light rays projected from the projection optical system according to Example 1 over a long distance.
Figure 8:
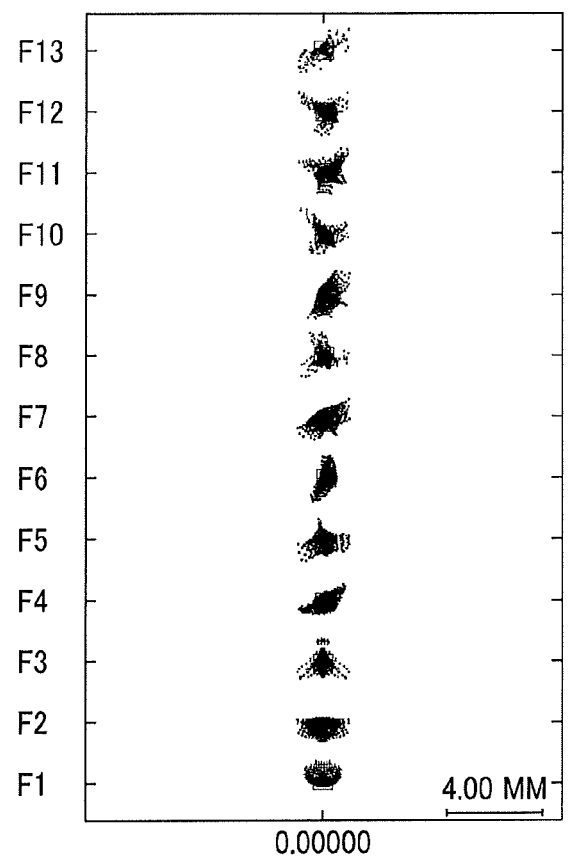
FIG. 8 is a spot diagram of light rays projected from the projection optical system according to Example 1 at a reference position.
Figure 9:
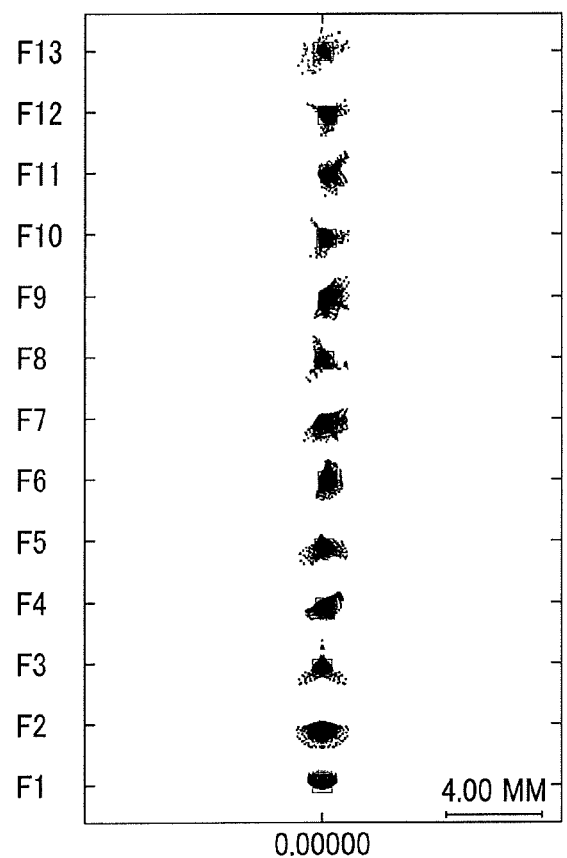
FIG. 9 is a spot diagram of light rays projected from the projection optical system according to Example 1 over a short distance.

FIGS. 7 through 9 illustrates spot diagrams obtained. FIG. 7 is a spot diagram with the enlarged image of a 100 inch (long distance). FIGS. 8 and 9 are spot diagrams with the enlarged image of a 80 inch (reference position) and with the enlarged image of a 60 inch (short distance), respectively.

In each spot diagram, the light rays of red color with a wavelength of 625 nm, light rays of green color with a wavelength of 550 nm, and light rays of blue color with a wavelength of 425 nm are superimposed on each other. It is clear from the spot diagrams that the projection optical system PO has good optical capability with chromatic aberration successfully corrected.

It is to be noted that the image display area in FIG. 6 is symmetrical. A spot diagram obtained when the evaluation positions F1 through F13 are set in the right half of the image display area are the same as the spot diagrams of FIGS. 7 through 9.

Example 2

A projection optical system PO according to Example 2 includes the refractive optical system 11 of FIG. 4 and the reflective optical system RO including a planar mirror (the planar mirror 12 of FIG. 1) and a concave mirror (the concave mirror 13 of FIG. 1) disposed on the magnification side.

In the refractive optical system 11 of FIG. 4, the first lens group I includes a positive meniscus lens with a convex surface toward the magnification side. The positive meniscus, which is made of resin, has aspherical surfaces on both sides, having a positive refractive power.

The second lens group II having a negative refractive power includes, in order from the magnification side, a negative meniscus lens, which is made of resin, having aspherical surfaces with a convex surface toward the reduction side, a biconcave lens with a greater curvature on the reduction side, and a negative meniscus lens with a convex surface toward the reduction side.

The third lens group III having a positive refractive power includes a positive meniscus lens with a convex surface toward the reduction side. The first lens group I, the second lens group II, and the third lens group III constitute the front group FG of the refractive optical system 11.

The fourth lens group IV, which is disposed on the magnification side of the rear group RG, includes a biconvex lens with a convex surface having a greater curvature on the reduction side.

The fifth lens group V having a positive refractive power includes nine lenses. Hereinafter, the nine lenses are referred to as a first lens L1 through a ninth lens L9 in order from the magnification side, in the same manner as in Example 1.

The first lens L1 is a biconcave lens with a concave surface having a greater curvature on the reduction side. The second lens L2 is a biconvex lens with a convex surface having a greater curvature on the magnification side. The first lens L1 and the second lens L2 are combined to form a cemented lens.

The third lens L3 is a negative meniscus lens with a convex surface toward the reduction side. The fourth lens L4 is a biconvex lens with aspherical surfaces, in which the curvature is greater on the magnification side. The fifth lens L5 is a negative meniscus lens with a convex surface toward the magnification side.

The sixth lens L6 is a positive meniscus lens with a convex surface toward the reduction side. The seventh lens L7 is a negative meniscus lens with a convex surface toward the reduction side. The sixth lens L6 and the seventh lens L7 are combined to form a cemented lens.

The eighth lens L8 is a negative meniscus lens with a convex surface toward the reduction side. The ninth lens L9 is a biconvex lens with aspherical surfaces, in which the curvature is greater on the reduction side.

An aperture stop S is disposed between the fifth lens L5 and the sixth lens L6.

As illustrated in FIG. 1, the refractive optical system 11 includes the planar mirror 12 and the concave mirror 13 on the magnification side. The concave mirror 13 has a free-form surface.

Table 7 represents data regarding the projection optical system PO according to Example 2 in the same manner as in Table 1.

TABLE 7

|   | R | D | Nd | Vd | Glass | Materials | Effective Diameters |
|---|---|---|---|---|---|---|---|
|   | ∞ | 1.00 | | | | | |
|   | ∞ | 1.00 | 1.51633 | 64.1420 | S-BSL7 | OHARA | |
|   | ∞ | 28.00 | | | | | |
| * | 15.425 | 6.00 | 1.49700 | 81.5459 | S-FPL51 | OHARA | 10.25 |
| * | −77.187 | 1.79 | | | | | 9.8 |
|   | 52.890 | 0.70 | 1.85478 | 24.7990 | S-NBH56 | OHARA | 9.2 |
|   | 29.580 | 1.14 | | | | | 9.0 |
|   | 15.516 | 0.80 | 1.90366 | 31.3150 | TAFD25 | HOYA | 8.8 |
|   | 9.940 | 2.60 | 1.53775 | 74.7031 | S-FPM3 | OHARA | 8.4 |
| 0 | 20.056 | 1.44 | | | | | 8.1 |
| top | ∞ | 2.55 | | | | | 8.0 |
| 1 | −19.611 | 0.70 | 1.53775 | 74.7031 | S-FPM3 | OHARA | 8.4 |
| 2 | −42.699 | 2.01 | | | | | 8.7 |
| 3 | 26.678 | 4.58 | 1.58913 | 61.1526 | L-BAL35 | OHARA | 10.0 |
| 4 | −19.882 | 0.30 | | | | | 10.3 |
| 5* | 41.592 | 0.80 | 1.81600 | 46.6206 | S-LAH59 | OHARA | 10.4 |
| 6* | 21.739 | 1.48 | | | | | 10.3 |
| 7 | 58.130 | 6.06 | 1.85478 | 24.7990 | S-NBH56 | OHARA | 10.4 |
| 8 | −12.870 | 1.00 | 1.91650 | 31.6041 | S-LAH88 | OHARA | 10.6 |
| 9 | 27.860 | 17.10 | | | | | 11.0 |
| 0 | 75.931 | 9.74 | 1.59522 | 67.7357 | S-FPM2 | OHARA | 22.4 |
| 1 | −48.799 | Variable A | | | | | 22.9 |
| 2 | 37.217 | 6.17 | 1.75700 | 47.8232 | S-LAM54 | OHARA | 24.2 |
| 3 | 90.427 | Variable B | | | | | 23.8 |
| 4 | 666.346 | 2.00 | 1.91650 | 31.6041 | S-LAH88 | OHARA | 23.3 |
| 5 | 75.497 | 9.76 | | | | | 22.6 |
| 6 | −38.360 | 2.20 | 1.83481 | 42.7253 | S-LAH55V | OHARA | 22.6 |
| 7 | 964.042 | 0.30 | | | | | 24.7 |
| 8* | 47.073 | 3.00 | 1.53046 | 55.8000 | | Resin | 25.3 |
| 9* | 27.388 | Variable C | | | | | 26.2 |
| 0* | −34.791 | 5.30 | 1.53046 | 55.8000 | | Resin | 28.3 |
| 1* | −30.585 | Variable D | | | | | 29.15 |

TABLE 7-continued

| | R | D | Nd | Vd | Glass Materials | Effective Diameters |
|---|---|---|---|---|---|---|
| 2 | ∞ | −82.93 | Reflection Surface | | | |
| 3** | ∞ | Variable E | Reflection Surface | | | |

[Variable Distance]
In the projection optical system PO of Example 2 as well, the size (the length of the diagonal line) of the largest image, which is enlarged and projected with a long projection distance, is 100 inch. The size of the smallest image, which is reduced and projected with a short projection distance, is 60 inch. The size of the reference image, which is projected with a reference position, is 80 inch.

Table 8 indicates variable distances with the short distance, reference position, and long distance, as in Table 2.

TABLE 8

| Screen Size | Short Distance 60 inch | Reference Position 80 inch | Long Distance 100 inch |
|---|---|---|---|
| Variable A | 2.00 | 3.03 | 3.54 |
| Variable B | 4.81 | 4.48 | 4.31 |
| Variable C | 23.02 | 18.46 | 16.08 |
| Variable D | 49.70 | 53.56 | 55.59 |
| Variable E | 297.04 | 385.42 | 473.41 |

[Data Regarding Aspherical Surface]
Table 9 represents data regarding aspherical surfaces (K: conic constant, and Ai: aspherical surface coefficient), as in Table 3.

TABLE 9

| | K | A4 | A6 | A8 | A10 | A12 | A14 | A16 |
|---|---|---|---|---|---|---|---|---|
| 4$^{th}$ Surface | 0.1378 | −2.0241E−05 | | | | | | |
| 5$^{th}$ Surface | −78.3049 | 2.1652E−05 | 1.4060E−07 | | | | | |
| 15$^{th}$ Surface | 1.7996 | −2.3606E−05 | −6.0352E−08 | | | | | |
| 16$^{th}$ Surface | −1.0833 | 1.2898E−05 | −4.7269E−08 | | | | | |
| 28$^{th}$ Surface | −4.2758 | −2.2742E−05 | −2.7249E−08 | 3.2226E−10 | −9.0197E−13 | 1.2636E−15 | −9.26832E−19 | 2.87074E−22 |
| 29$^{th}$ Surface | −1.6081 | −5.5024E−05 | 8.3205E−08 | −7.5460E−11 | 2.3101E−14 | | | |
| 30$^{th}$ Surface | −0.2509 | −3.4657E−05 | 4.9250E−08 | −1.3282E−10 | 3.8358E−13 | −4.1608E−16 | 1.5424E−19 | |
| 31$^{st}$ Surface | −0.7157 | −2.6314E−05 | 1.8397E−08 | −2.4843E−11 | −6.1850E−14 | 4.0889E−16 | −5.11951E−19 | 1.97594E−22 |

[Data Regarding Free-Form Surface]
Table 10 represents data regarding free-form surface (K: conic constant, and Ai: aspherical surface coefficient), as in Table 4.

TABLE 10

| | 33th Surface |
|---|---|
| K | 0 |
| C4 | 1.0582E−02 |
| C6 | −8.2531E−04 |
| C8 | 9.9460E−05 |
| C10 | −2.2150E−04 |
| C11 | −7.4734E−07 |
| C13 | 7.7163E−06 |
| C15 | −3.5768E−07 |
| C17 | −2.8343E−08 |
| C19 | 1.8056E−07 |
| C21 | 3.8225E−08 |
| C22 | 1.1049E−10 |
| C26 | 1.0935E−09 |
| C28 | 4.2954E−10 |
| C30 | −2.2417E−12 |
| C32 | −5.5901E−11 |
| C34 | −1.3183E−11 |
| C36 | −1.7253E−13 |
| C37 | −1.6625E−14 |
| C39 | 3.3160E−15 |
| C41 | −5.9419E−13 |
| C43 | −1.2863E−13 |
| C45 | −1.7223E−14 |
| C47 | 3.3385E−16 |
| C49 | 1.8374E−15 |
| C51 | −1.5395E−15 |
| C53 | 8.8023E−16 |
| C55 | 6.2272E−17 |
| C56 | 1.5129E−18 |
| C58 | 7.2133E−18 |
| C60 | 1.7912E−17 |
| C64 | 1.0211E−17 |
| C66 | 1.1251E−18 |

[Position of Planar Mirror and Concave Mirror]
The first lens group I of the front group FG in the projection optical system PO is positioned at the maximum-magnification side with the projection optical system PO focused to a short distance, in which the projection distance is the shortest. In this state, with the position of the magnification-side surface of the first lens group I along the optical A axis the reference position (Y=Z=0), Table 11 represents the positions and tilt (α) of the 32th surface of the planar mirror 12 and the 33th surface of the concave mirror 13, as in Table 5.

TABLE 11

|  | Z-Axis Direction | Y-Axis Direction | α |
|---|---|---|---|
| 32$^{th}$ Surface | 0.00 | 55.59 | 45.00 |
| 33$^{th}$ Surface | 82.93 | 77.48 | 12.80 |

[Values of Parameters in Conditional Formulas]

The values of parameters in conditional formulas (1) and (2) are as follows:

In conditional formula (1), the value of F2/F3 is −0.27. In conditional formula (2), the value of F1/FL is 16.37.

[Values of Parameter (TR)]

Table 12 represents the values of TR (the ratio of L to W) in conditional formula (3), as in Table 5.

TABLE 12

|  | Short Distance 60 inch | Reference Position 80 inch | Long Distance 100 inch |
|---|---|---|---|
| Projection Distance | 299.67 | 388.02 | 476.00 |
| TR | 0.226 | 0.219 | 0.215 |

As in Table 1, the largest enlarged image is formed with an extremely short projection distance.

Table 12-A represents the values of the focal length f of the entire projection optical system PO, and the numerical aperture NA.

TABLE 12-A

|  | Short Distance | Reference Position | Long Distance |
|---|---|---|---|
| A | 20.19 0.200 | 20.42 0.200 | 20.86 0.200 |

The size of the image display surface LV of the image display element SE, such as a digital mirror device (DMD), is as follows:

The length in direction X: 14.5152 mm;
The length in direction Z: 8.1648 mm;
Dot size: 7.56 μm; and
Distance from the optical axis (A axis) of the refractive optical system 11 to the center of the image surface: 5.30 mm.

The image display element SE and its position are the same as in Example 1.

Evaluation results based on the spot diagram is given below of the projection optical system PO according to Example 2.

In the same manner as in Example 1, evaluation positions F1 through F13 are set within the image forming area of the image display surface LV in FIG. 6. A spot diagram is obtained by tracing the light rays emitted from the evaluation positions F1 through F13.

Figure 10:
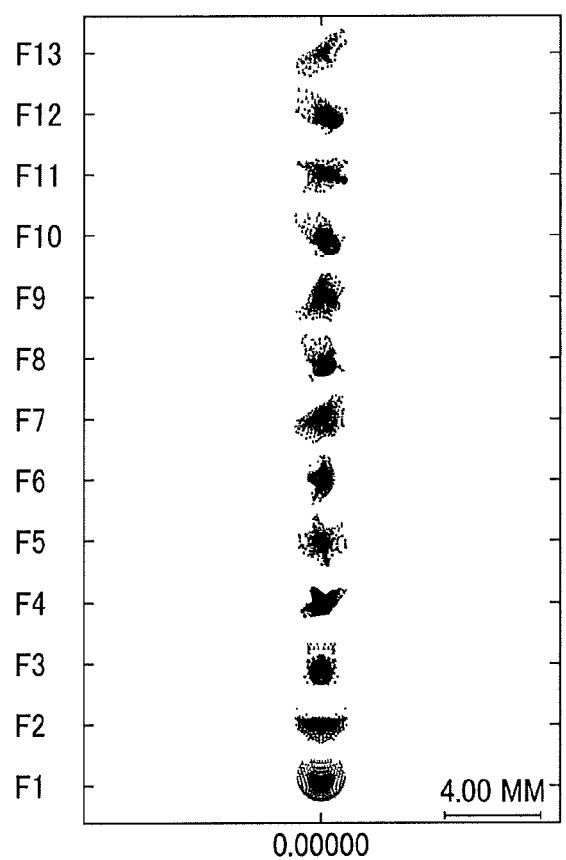
FIG. 10 is a spot diagram of light rays projected from the projection optical system according to Example 2 over a long distance.
Figure 11:
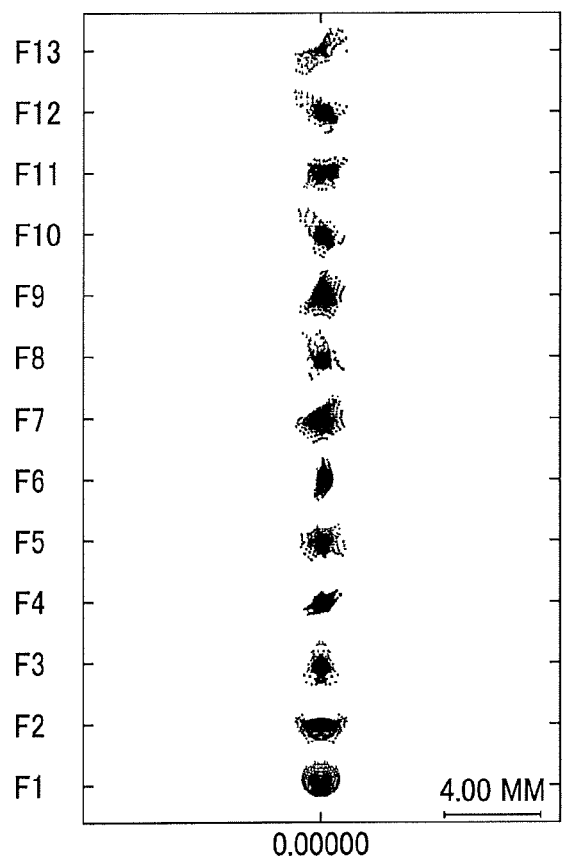
FIG. 11 is a spot diagram of light rays projected from the projection optical system according to Example 2 at a reference position.
Figure 12:
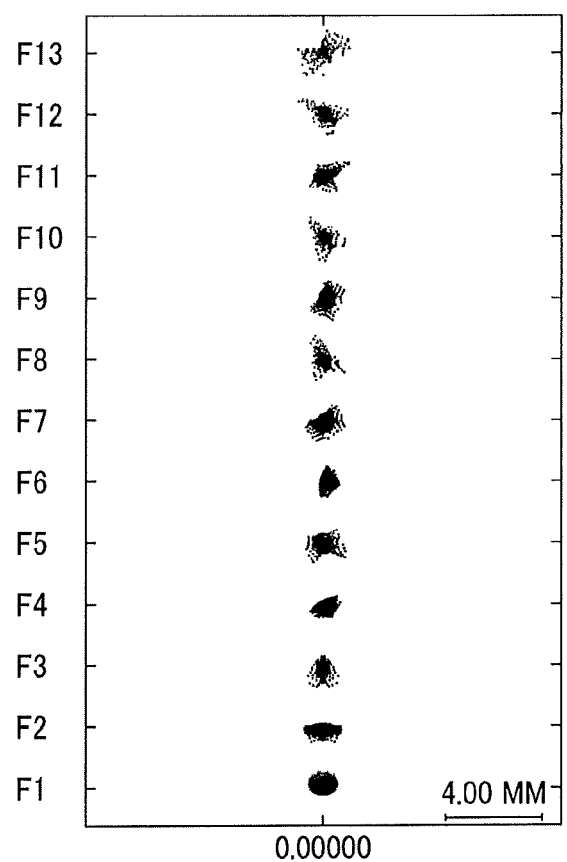
FIG. 12 is a spot diagram of light rays projected from the projection optical system according to Example 2 over a short distance.

FIGS. 10 through 12 illustrates spot diagrams obtained. FIG. 10 is a spot diagram with the enlarged image of a 100 inch (long distance). FIGS. 11 and 12 are spot diagrams with the enlarged image of a 80 inch (reference position) and with the enlarged image of a 60 inch (short distance), respectively.

In the same manner as in Example 1, light rays of red color with a wavelength of 625 nm, light rays of green color with a wavelength of 550 nm, and light rays of blue color with a wavelength of 425 nm are superimposed on each other in each spot diagram. It is clear from the spot diagrams that the projection optical system PO has good optical capability with chromatic aberration successfully corrected.

In Examples 1 and 2, the rear group RG of the refractive optical system 11 is fixed during changes in focus.

The refractive optical system 11 in Examples 1 and 2 is non-telecentric.

According to the Examples described above, the projection optical system is produced as follows.

—Aspect 1—

A projection optical system PO (FIGS. 3 and 4, and Examples 1 and 2 of the projection optical system PO) to enlarge and project an image displayed on an image display element SE includes a reflective optical system RO (12 and 13) on the magnification side and a refractive optical system 11 on the reduction side along the projection optical path. The reflective optical system RO includes at least one reflective optical element 13 having a power. The refractive optical system 11 includes a front group FG on the magnification side and a rear group RG on the reduction side. The front group FG includes, in order from the magnification side, a first lens group I having a positive or negative refractive power, a second lens group II having a negative reflective power, and a third lens group III having a positive refractive power. The rear group RG has a positive refractive power. The first lens group I moves to the magnification side, and the second lens group II and the third lens group III move to the reduction side in focusing the projection optical system PO from a long distance to a short distance.

—Aspect 2—

The projection optical system PO (Examples 1 and 2 of the projection optical system PO) according to Aspect 1 satisfies conditional formula (1):

$$-0.20 < F2/F3 < -0.5, \tag{1}$$

where, F2 (<0) is the focal length of the second lens group II, and F3 (>0) is the focal length of the third lens group III in the front group FG of the refractive optical system 11.

—Aspect 3—

In the projection optical system PO (FIGS. 3 and 4, and Examples 1 and 2 of the projection optical system PO) according to Aspect 1 or 2, the rear group RG of the refractive optical system 11 is fixed during changes in focus.

—Aspect 4—

In the projection optical system PO (FIGS. 3 and 4, Examples 1 and 2 of the projection optical system PO) according to any one of Aspect 1 through Aspect 3, each of the first lens group I and the third lens group III of the front group FG in the refractive optical system 11 includes one lens.

—Aspect 5—

In the projection optical system PO (FIGS. 3 and 4, Examples 1 and 2 of the projection optical system PO) according to any one of Aspect 1 through Aspect 4, the rear group RG of the refractive optical system 11, which includes a plurality of lenses, is divided into two lens groups (IV and V) at a point, in which the difference in the outer diameter is greatest between adjacent lenses. Between the adjacent lenses, the lens on the magnification side has a greater outer diameter.

—Aspect 6—

In the projection optical system PO (FIGS. 3 and 4, Examples 1 and 2 of the projection optical system PO)

according to Aspect 5, the two lens groups are the fourth lens group IV disposed on the magnification side and the fifth lens group V disposed on the reduction side.

—Aspect 7—

In the projection optical system PO (Examples 1 and 2 of the projection optical system PO) according to any one of Aspect 1 through Aspect 6, the reflective optical element 13 having a power of the reflective optical system RO is a concave mirror with a free-form surface.

—Aspect 8—

The projection optical system PO (Examples 1 and 2 of the projection optical system PO) according to any one of Aspect 1 through Aspect 7 satisfies conditional formula (2):

$$10 < F1/FL < 80, \tag{2}$$

where FL is the focal length of the refractive optical system 11, and F1 is the focal length of the first lens group I when an enlarged and projected image is largest.

[Examples of Lens Holding Device]

The projection apparatus PD is a projector including the projection optical system PO as described above. The refractive optical system 11 of the projection optical system PO is held by a lens holding device HD. The lens holding device HD allows the focusing group of the refractive optical system 11 to move (displace) with changes in focus.

Hereinafter, a description is given of the lens holding device HD according to Examples 1 through 6. The lens holding device HD according to Examples 1 through 5 holds the refractive optical system 11 of the projection optical system PO according to Example 1. The lens holding device HD according to Example 6 holds the refractive optical system 11 of the projection optical system PO according to Example 2.

Example 1

Figure 13:
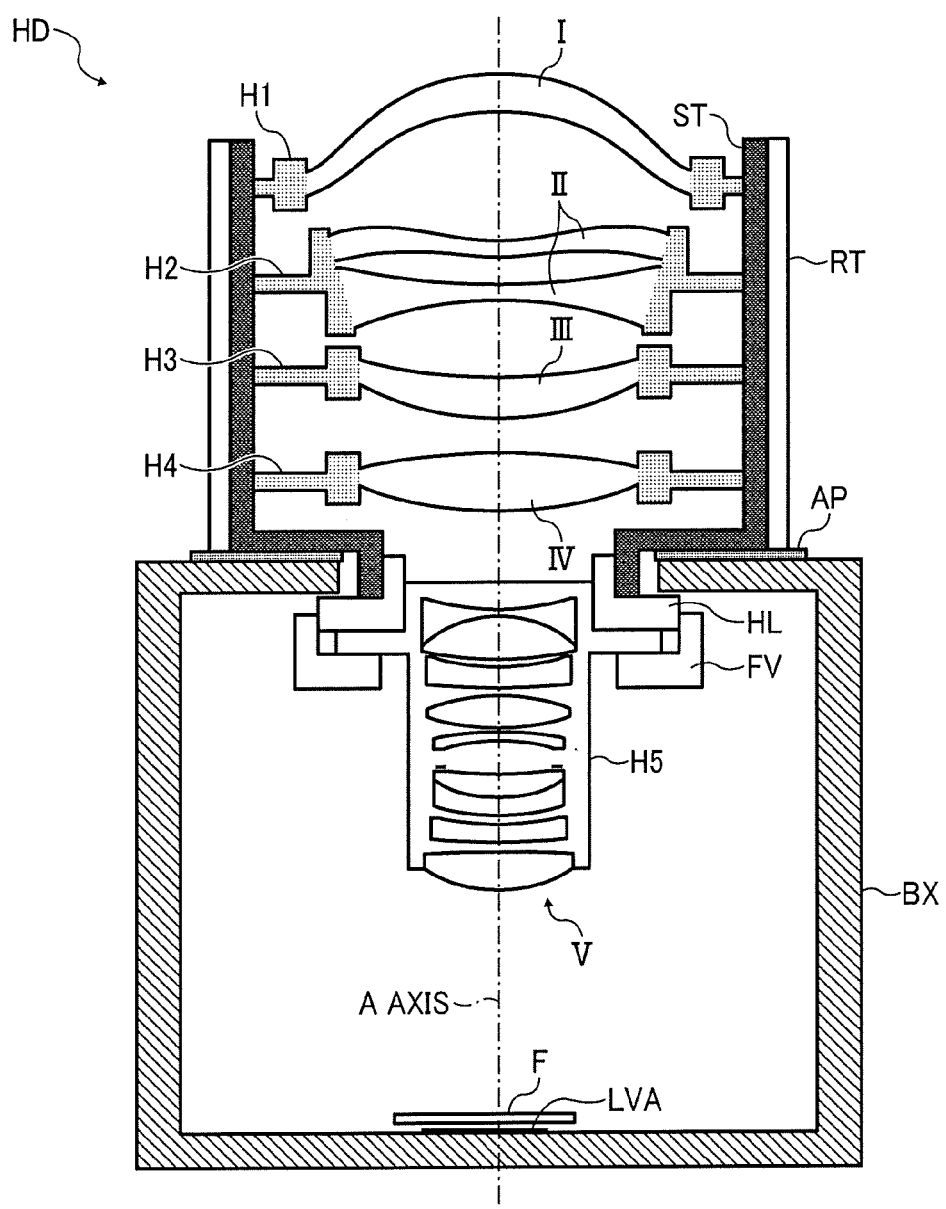
FIG. 13 is an illustration of a lens holding device according to Example 1.

A description is provided of Example 1 of the lens holding device HD referring to FIG. 13.

In FIG. 13, the symbol "H1" denotes a lens holder for the first lens group I, which is hereinafter referred to as a lens-group holder H1. The symbol "H2" denotes a lens holder for the second lens group II, which is hereinafter referred to as a lens-group holder H2. The symbol "H3" denotes a lens holder for the third lens group III, which is hereinafter referred to as a lens-group folder H3. The symbol "H4" denotes a lens holder for the fourth lens group IV, which is hereinafter referred to as a lens-group holder H4. The symbol "H5" denotes a lens holder for the fifth lens group V, which is hereinafter referred to as a lens-group holder V. The lens-group holders H1 through H5 fix and hold the first lens group I through the fifth lens group V, respectively. The lens-group holders H1 through H4 are annular, and the lens-group holder H5 is a lens barrel.

Still referring to FIG. 13, the symbol "ST" denotes a straight barrel, and the symbol "RT" denotes a rotary barrel, both of which have a hollow cylindrical shape.

The straight barrel ST contacts the lens-group holders H1 through H4 to hold the lens-group holders H1 through H4. In this case, the inner peripheral surface of the straight barrel ST is adjacent to or in contact with the outer peripheral surfaces of the lens-group holders H1 through H4 to hold the lens-group holders H1 through H4.

Thus, with such a configuration that allows the inner peripheral surface of the straight barrel ST to be adjacent to or in contact with the outer peripheral surfaces of the lens-group holders H1 through H4 of a annular shape, both surfaces adjacent to each other or in contact with each other provide good performance in accuracy, thereby preventing the eccentricity of the first lens group I through the fourth lens group IV in the direction perpendicular with the A axis.

According to Example 1, each of the annular lens-group holders H1 through H4 has an outer diameter (diameter of the outer peripheral surface) that is the same as the diameter of the inner peripheral surface of the straight barrel ST. Alternatively, the diameters may slight differ from each other.

The straight barrel ST is fixed onto a box BX via an adjusting plate AP. The rotary barrel RT, which is disposed along the outer peripheral surface of the straight barrel ST, is rotatable around the A axis.

The lens-group holder H4 is fixed onto and held by the straight barrel ST. The lens-group holders H1 through H3 are held by the straight barrel ST such that the lens-group holders H1 through H3 are movable in the direction parallel to the A axis.

The lens-group holders H1 through H3 are connected to curved cams formed on the rotary barrel RT through holes on the straight barrel ST, each hole elongating in the direction parallel to the A axis. Rotating the rotary barrel RT moves the lens-group holders H1 through H3 along the direction of the A axis.

During such a movement, the straight barrel ST prevents the lens-group holders H1 through H3 from rotating around the A axis while allowing the straight movement of the lens-group holders H1 through H3 along the direction of the A axis.

The curved cams of the rotary barrel RT is shaped to allow the first lens group I through the third lens group III held by the lens-group holders H1 through H3 to move (displace) while maintaining predetermined relative positions.

Accordingly, rotating the rotary barrel RT moves the first lens group I through the third lens group III as the focusing group along the direction of the A axis, thereby perform focusing.

The lens-group holder H5, which holds the fifth lens group V, is connected to the straight barrel ST through the helicoid HL. The lens-group holder H5 is fixed onto the helicoid HL by fixing members FV. The fixation of lens-group holder H5 by the fixing members FV is released as appropriate.

Rotating the helicoid HL moves the fifth lens group V along the direction of the A axis. FIG. 13 is an illustration of the state, in which the first lens group V is at a position closest to the fourth lens group IV after movement with the rotation of the helicoid HL.

Rotating the helicoid HL rotates the fifth lens group V around the A axis, thereby releasing the fixation of the lens-group holder H5 onto the helicoid HL by the fixing members FV, thus rotating the fifth lens group V around the optical axis relative to the helicoid HL while maintaining the fifth lens group V at the position after movement along the direction of the A axis. With such a rotation, the relations in eccentricity of the lenses within the fifth lens group V and the lenses on the magnification side of the fourth lens group IV is maintained in the state as before changes in focus.

The box BX has an image display element SE with a main part LVA and a cover glass F, which are fixed onto the bottom of the box BX.

In a projector that performs projection with an ultra-short projection distance, image field is vulnerable to the error in distance between the refractive optical system 11 and the image display element SE. Accordingly, back focus is adjusted with a high degree of accuracy.

The distance between the refractive optical system 11 and the image display element SE is adjusted by the movement of the fifth lens group V along the direction of the A axis with the rotation of the helicoid HL and by changes in thickness of an adjustment plate AP disposed between the box BX and the lens barrel of the straight barrel ST and the rotary barrel RT.

Thus, with adjustment of movement of the fifth lens group V and changes in thickness of the adjusting plate AP, back focus is adjusted with a high degree of accuracy, thereby improving yield in assembling of the projection apparatus PD.

Example 2

Figure 14:
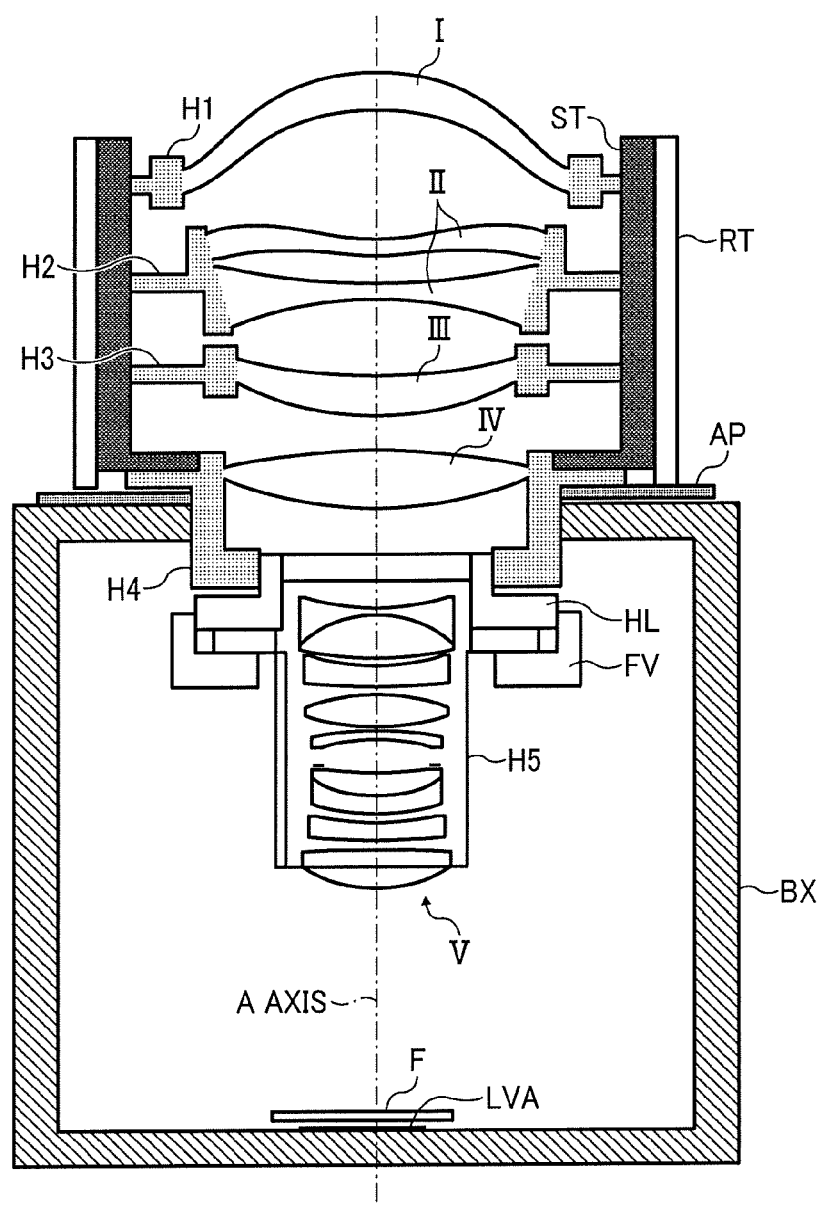
FIG. 14 is an illustration of a lens holding device according to Example 2.

A description is provided of Example 2 of the lens holding device HD referring to FIG. 14.

The same reference signs as in FIG. 13 are given to corresponding elements in FIG. 14 to facilitate understanding of elements. In FIG. 14 as well, the symbols "H1" through "H5" denote a lens holder for the first lens group I, which is hereinafter referred to as a lens-group holder H1, through a lens holder for the fifth lens group V, which is hereinafter referred to as a lens-group holder V. The lens-group holders H1 through H5 fix and hold the first lens group I through the fifth lens group V, respectively. The lens-group holders H1 through H are annular.

The symbol "ST" denotes a straight barrel, and the symbol "RT" denotes a rotary barrel, both of which have a hollow cylindrical shape. The straight barrel ST is in contact with the outer peripheral surfaces of the lens-group holders H1 through H3 to hold the lens-group holders H1 through H3. The lens-group holder H4 is fixed by the straight barrel ST. As illustrated in FIG. 14, the diameters of the outer peripheral surfaces adjacent to or in contact with the inner peripheral surface of the straight barrel ST differ from the diameter of the outer peripheral surface of the lens-group holder H4.

The straight barrel ST is fixed onto a box BX by the lens-group holder H4, which is fixed onto the straight barrel ST, through an adjusting plate AP. A rotary barrel RT, which is disposed along the outer peripheral surface of the straight barrel St, is rotatable around the A axis.

The lens-group holders H1 through H3 is held by the straight barrel ST such that the lens-group H1 through H3 are movable along the direction of the A axis. The lens-group holders H1 through H3 are connected to curved cams formed on the rotary barrel RT through holes on the straight barrel ST, each hole elongating in the direction parallel to the A axis. Accordingly, rotating the rotary barrel RT moves the lens-group holders H1 through H3 along the direction of the A axis.

During such a movement, the straight barrel ST prevents the lens-group holders H1 through H3 from rotating around the A axis while allowing the straight movement along the direction of the A axis of the lens-group holders H1 through H3.

The curved cams of the rotary barrel RT is shaped to allow the first lens group I through the third lens group III held by the lens-group holders H1 through H3 to move (displace) with changes in focus. Accordingly, rotating the rotary barrel RT moves the first lens group I through the third lens group III as the focusing group along the direction of the A axis, thereby perform focusing.

The lens-group holder H5, which holds the fifth lens group V, is connected to the straight barrel ST through the helicoid HL. The lens-group holder H5 is fixed onto the helicoid HL by fixing members FV. Rotating the helicoid HL moves the fifth lens group V along the direction of the A axis. Rotating the helicoid HL rotates the fifth lens group V around the A axis, thereby releasing the fixation of the lens-group holder H5 onto the helicoid HL by the fixing members FV, thus rotating the fifth lens group V around the optical axis relative to the helicoid HL while maintaining the fifth lens group V at the position after movement along the direction of the A axis. With such a rotation, the relations in eccentricity of the lenses within the fifth lens group V and the lenses on the magnification side of the fourth lens group IV is maintained in the same manner as before focusing.

The box BX has an image display element SE with a main part LVA and a cover glass F, which are fixed onto the bottom of the box BX.

With changes in thickness of the adjustment plate AP disposed between the box BX including the image display element SE on the bottom and the lens-group holder H4 fixed onto the straight barrel ST of the lens barrel, the distance between the refractive optical system 11 and the image display element SE is adjusted.

Thus, in the same manner as in Example 1, the back focus of the refractive optical system 11 is adjusted with a high degree of accuracy.

Example 3

Figure 15:
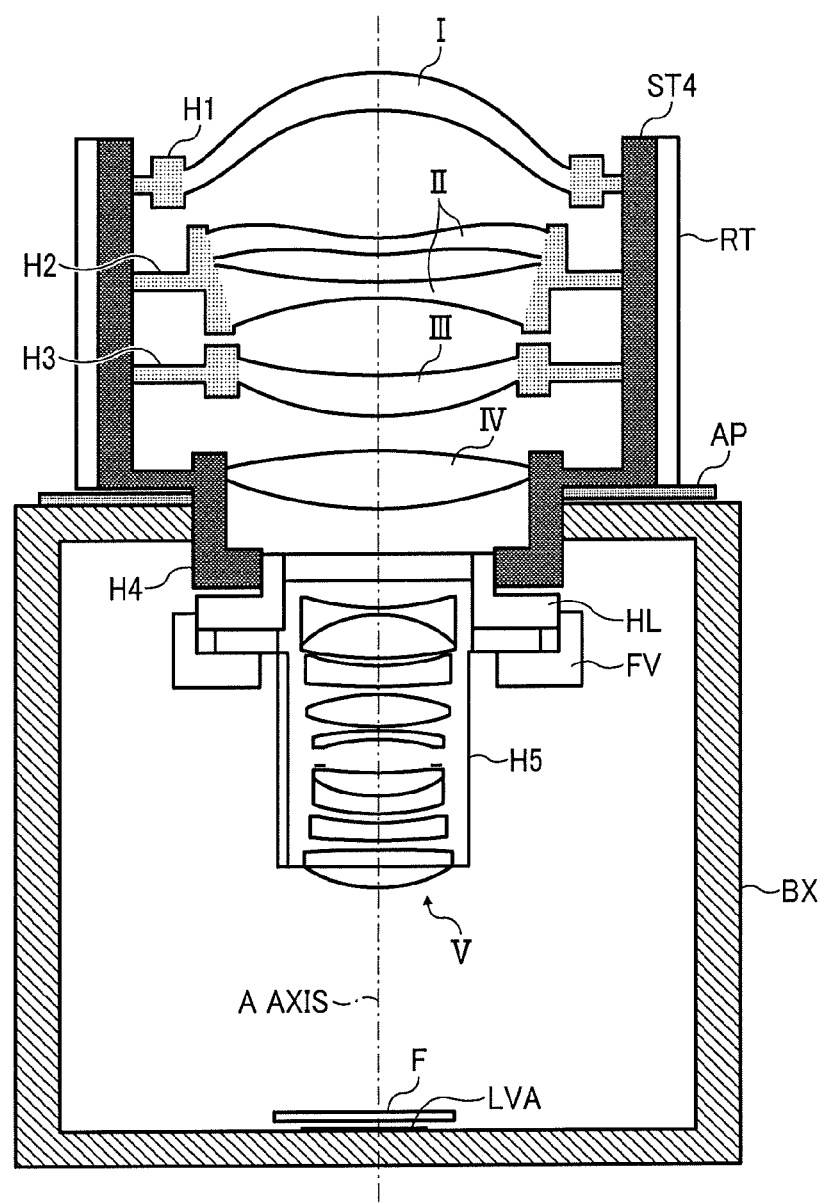
FIG. 15 is an illustration of a lens holding device according to Example 3.

A description is provided of Example 3 referring to FIG. 15. The same reference signs as in FIGS. 13 and 14 are given to corresponding elements in FIG. 15 to facilitate understanding of elements.

In Example 2 described above, the lens-group holder H4 to hold the fourth lens group IV is fixed onto the straight barrel ST by another member different from the straight barrel ST.

In Example 3, the lens-group holder H4 is integrated into a straight barrel ST4 as a part of the straight barrel ST4. Example 3 differs from Example 4 only in such a point.

Except for such a difference, Example 3 is the same as in Example 2 with respect to the movement of the first lens group I through the third lens group III with changes in focus, the movement of the fifth lens group V along the direction of the A axis with the rotation of the helicoid HL, and the rotation of the fifth lens group V around the optical axis while maintaining the position of the fifth lens group V after movement along the direction of the A axis.

As in Examples 1 and 2, adjusting the movement of the fifth lens group V and the thickness of adjusting plate AP performs focusing with a high degree of accuracy, thereby improving yield in assembling of the projection apparatus PD.

Example 4

Figure 16:
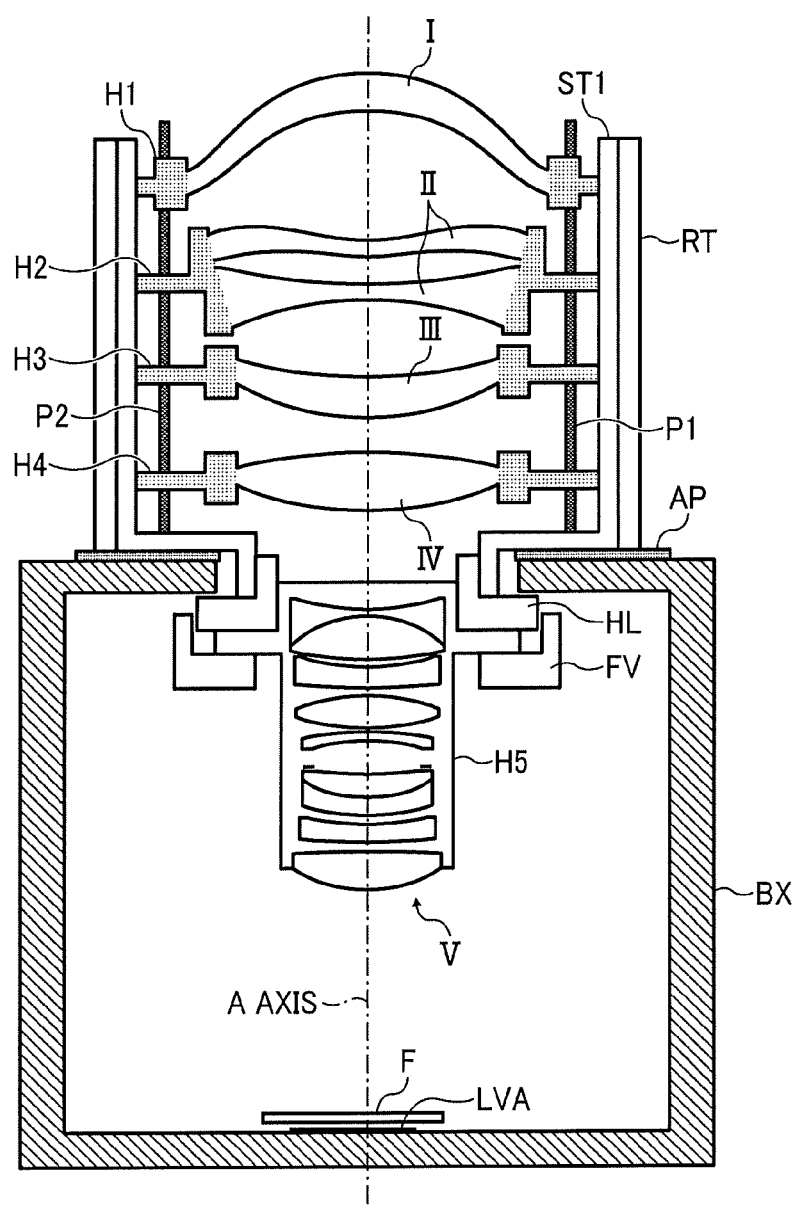
FIG. 16 is an illustration of a lens holding device according to Example 4.

A description is provided of Example 4 referring to FIG. 16.

The same reference signs as in FIGS. 13 through 15 are given to corresponding elements in FIG. 16 to facilitate understanding of elements.

The lens-group holders H1 through H5 fix and hold the first lens group I through the fifth lens group V, respectively. The lens-group holders H1 through H4 are annular.

In FIG. 16, the symbol "ST1" denotes a straight barrel, and the symbol "RT" denotes a rotary barrel, both of which have a hollow cylindrical shape.

The lens-group holders H1 through H4 are held by pins P1 and P2 in contact with the lens-group holders H1 through H4. The pins P1 and P2, which are in parallel with the A axis, are disposed on flanges that constitute the bottom of the straight barrel ST1. That is, the pins P1 and P2 penetrate through the lens-group holders H1 through H4 in a manner parallel with the A axis. In each through-hole, the surfaces of the pin P1 or P2 and the lens-group holder (H1, H2, H3, or H4) adjacent to or in contact with each other provide good performance in accuracy, thereby preventing the eccentricity of the first lens group I through the fourth lens group IV in the direction perpendicular with the A axis.

The straight barrel ST1 is fixed on a box BX through an adjusting plate AP. A rotary barrel RT, which is disposed along the outer peripheral surface of the straight barrel ST1, is rotatable around the A axis.

The lens-group holder H4 is fixed and held by the pins P1 and P2. The lens-group holders H1 through H3 are movable through the pins P1 and P2 along the direction of the A axis, relative to the straight barrel ST.

The lens-group holders H1 through H3 are connected to curved cams formed on the rotary barrel RT through the straight barrel ST1. Rotating the rotary barrel RT moves the lens-group holders H1 through H3 along the direction of the A axis. During such a movement, the straight barrel ST1 prevents the lens-group holders H1 through H3 to rotate around the A axis because of the pins P1 and P2, while allowing the lens-group holders H1 through H3 to merely move straight along the direction of the A axis.

The "curved cams" of the rotary barrel RT is shaped to allow the first lens group I through the third lens group III held by the lens-group holders H1 through H3 to move with changes in focus. The rotation of the rotary barrel RT moves the first lens group I through the third lens group III along the direction of the A axis.

The lens-group holder H5 is connected to the straight barrel ST through the helicoid HL. The lens-group holder H5 is fixed onto the helicoid HL by fixing members FV. Rotating the helicoid HL moves the fifth lens group V along the direction of the A axis.

FIG. 15 is an illustration of the state, in which the first lens group V is at a position closest to the fourth lens group IV after movement with the rotation of the helicoid HL.

As in Example 1, rotating the helicoid HL rotates the fifth lens group V around the A axis, thereby releasing the fixation of the lens-group holder H5 onto the helicoid HL by the fixing members FV, thus rotating the fifth lens group V around the optical axis relative to the helicoid HL while maintaining the fifth lens group V at the position after movement along the direction of the A axis.

Further, as in Example 1, the box BX has the bottom with an image display element SE fixed. In the same manner as in Example 1, the movement of the fifth lens group V and the adjustment of thickness of the adjusting plate AP adjust the distance (back focus) between the refractive optical system 11 and the image display element SE. It is to be noted that one or three pins, but not limited to two, may be used.

Example 5

Figure 17:
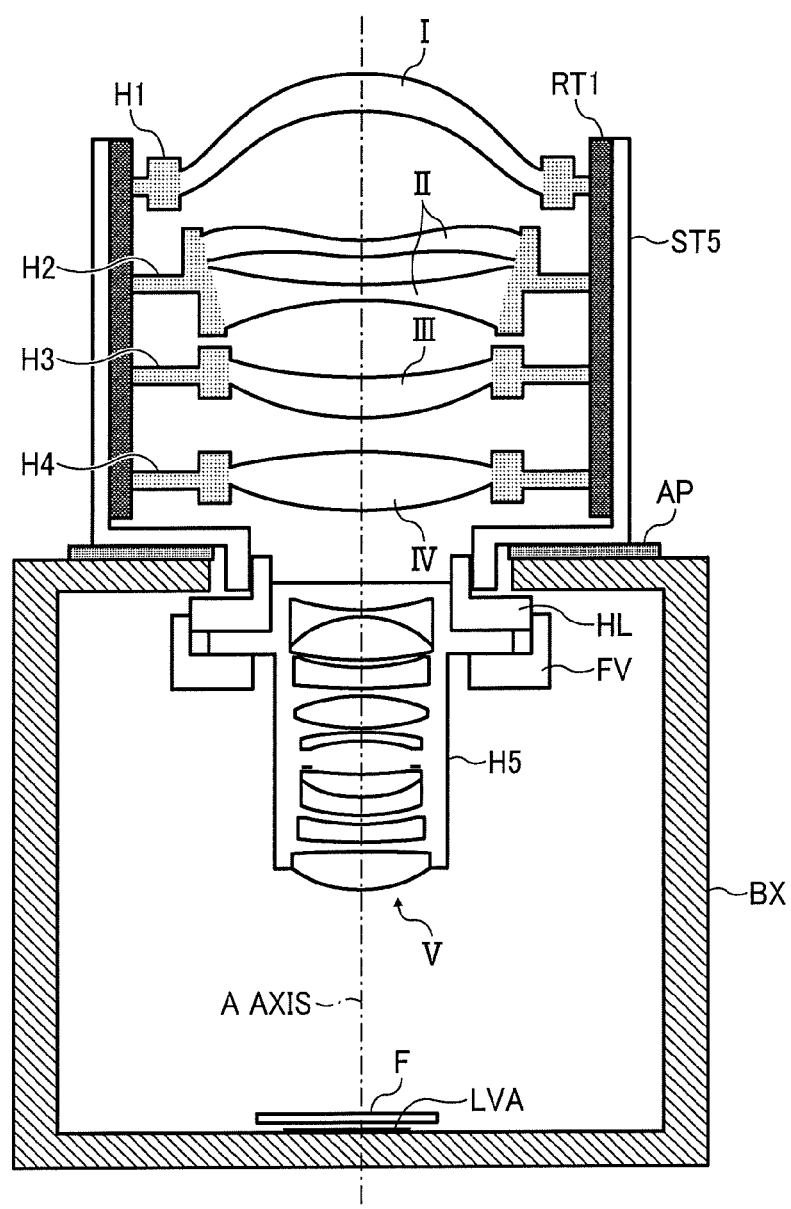
FIG. 17 is an illustration of a lens holding device according to Example 5.

A description is given of Example 5 referring to FIG. 17.

The same reference signs as in FIG. 13 are given to corresponding elements in FIG. 14 to facilitate understanding of elements. In FIG. 17 as well, the lens-group holders H1 through H5 fix and hold the first lens group I through the fifth lens group V, respectively. The lens-group holders H1 through H5 are annular.

In FIG. 17, the symbol "ST5" denotes a "straight barrel", and the symbol "RT1" denotes a "rotary barrel", both of which have a hollow cylindrical shape.

The rotary barrel RT1 according to Example 5 is disposed along the inner peripheral surface of the straight barrel ST5.

The lens-group holders H1 through H4 is held by the rotary barrel RT1 in contact with the lens-group holders H1 through H4. Thus, with such a configuration that allows the inner peripheral surface of the rotary barrel RT1 to be adjacent to or in contact with the outer peripheral surfaces of the lens-group holders H1 through H4 of a annular shape, both surfaces adjacent to each other or in contact with each other provide good performance in accuracy, thereby eliminating or reducing the eccentricity of the first lens group I through the fourth lens group IV in the direction perpendicular with the A axis.

According to Example 5, each of the annular lens-group holders H1 through H4 has an outer diameter (diameter of the outer peripheral surface) that is the same as the diameter of the inner peripheral surface of the rotary barrel RT1. Alternatively, the diameters may slight differ from each other.

The rotary barrel RT1 is rotatable around the A axis. The straight barrel ST5, which is disposed along the outer peripheral surface of the rotary barrel RT1, is fixed onto a box BX through an adjusting plate AP.

The lens-group holder H4 is fixed onto and held by the rotary barrel RT1. The lens-group holders H1 through H3 are held by the rotary barrel RT1 such that the lens-group holders H1 through H3 are movable along the direction of the A axis.

The lens-group holders H1 through H3 are connected to grooves formed on the straight barrel ST5, through curved cam holes in the rotary barrel RT1. Each groove is elongate parallel with the direction of the A axis. With rotation of the rotary barrel RT1, the movement of the lens-group holders H1 through H3 is restricted by the grooves formed on the straight barrel ST5 to the direction parallel with the A axis, allowing the lens-group holders H1 through H3 to move according to the shape of the curved cam holes.

That is, the straight barrel ST5 prevents the lens-group holders H1 through H3 from rotating around the A axis while allowing the straight movement of the lens-group holders H1 through H3 along the direction of the A axis.

The curved cam holes of the rotary barrel RT1 is shaped to allow the first lens group I through the third lens group III held by the lens-group holders H1 through H3 to move with changes in focus. Accordingly, rotating the rotary barrel RT moves the first lens group I through the third lens group H1 as the focusing group along the direction of the A axis, thereby perform focusing.

The lens-group holder H5, which holds the fifth lens group V, is connected to the straight barrel ST5 through the helicoid HL. The lens-group holder H5 is fixed onto the helicoid HL by fixing members FV.

Thus, rotating the helicoid HL moves the fifth lens group V along the direction of the A axis. FIG. 17 is an illustration of the state, in which the first lens group V is at a position closest to the fourth lens group IV after movement with the rotation of the helicoid HL.

Rotating the helicoid HL rotates the fifth lens group V around the A axis, thereby releasing the fixation of the lens-group holder H5 onto the helicoid HL by the fixing members FV, thus rotating the fifth lens group V around the optical axis relative to the helicoid HL while maintaining the fifth lens group V at the position after movement along the direction of the A axis. Thus, with such a configuration that rotates the fifth lens group V relative to the helicoid HL while maintaining the position of the fifth lens group V after movement along the direction of the A axis, the relations in eccentricity of the lenses within the fifth lens group V and the lenses on the magnification side of the fourth lens group IV s maintained in the same state as before changes in focus.

Further, as in Example 1, the box BX has the bottom with an image display element SE fixed. In the same manner as in Example 1, the movement of the fifth lens group V and the adjustment of thickness of the adjusting plate AP adjust the distance (back focus) between the refractive optical system 11 and the image display element SE.

Example 6

Figure 18:
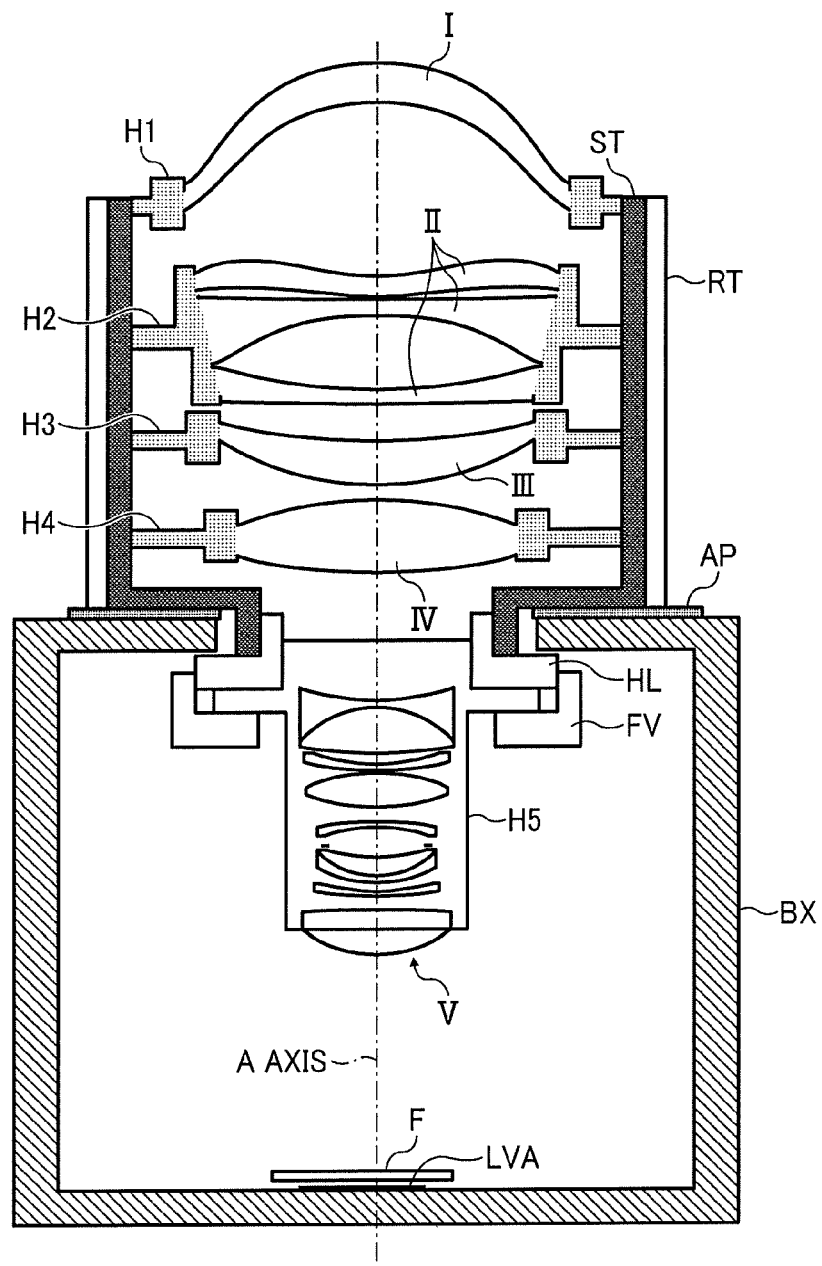
FIG. 18 is an illustration of a lens holding device according to Example 6.

A description is given of Example 6 referring to FIG. 18.

The same reference signs as in FIGS. 13 through 17 are given to corresponding elements in FIG. 18 to facilitate understanding of elements.

In Example 6, the lens holding device HD as described in Example 1 includes the refractive optical system 11 of the projection optical system PO according to Example 2.

Example 6 differs from Example 1 in that the second lens group II held by the lens-group holder H2 includes three negative lenses in Example 6.

The lens holding device HD has the same functions as in Example 1, that moves the first lens group I through the third lens group III as the focusing group, and that move the fifth lens group V along the direction of the A axis while moving the fifth lens group V around the A axis. The description of the functions is omitted herein.

As described above, the lens holding device HD according to Example 6 holds the refractive optical system 11 of the projection optical system PO according to Example 2.

As described above, the projection apparatus according to the present disclosure is achieved as described below.

Aspect 9

A projection apparatus PD (FIGS. 1, 3, and 4, Examples 1 and 2 of the projection optical system PO, and Examples 1 through 6 of the lens holding device HD) includes an image display device SS having an image display element SE, a projection optical system PO (11, 12, and 13), and a lens holding device HD. The projection optical system PO, which enlarges and projects an image displayed on the image display element SE of the image display device SS onto a projection surface SC, includes a reflective optical system RO (12 and 13) on the magnification side and a refractive optical system 11 on the reduction side along the projection optical path. The reflective optical system RO (12 and 13) includes at least one reflective optical element 13 having a power. The refractive optical system 11 includes a front group FG on the magnification side and a rear group RG on the reduction side. The front group FG includes, in order from the magnification side toward the reduction side, a first lens group I having a positive or negative refractive power, a second lens group II having a negative refractive power, and a third lens group III having a positive refractive power. The rear group RG has a positive refractive power. The first lens group I moves to the magnification side, and the second lens group II and the third lens group III move to the reduction side with changes in focus from a long distance to a short distance. The lens holding device HD holds the refractive optical system 11 to perform focusing.

—Aspect 10—

In the projection apparatus PD (FIGS. 13 through 18, and Examples 1 through 6 of the lens holding device HD) according to Aspect 9, the rear group RG of the refractive optical system 11 includes a plurality of lenses, which is divided into a fourth lens group IV and a fifth lens group V at a point with the greatest difference in the outer diameter between adjacent lenses. Among the adjacent lenses, the lens of the fourth lens group IV disposed on the magnification side has a greater outer diameter than the outer diameter of the other lens of the fifth lens group V. In the lend holding device HD including lens-group holders H1 through H5 to hold the respective lens groups I through V in the refractive optical system 11, the lens-group holder H2 to hold the second lens group II in the front group FG and the lens-group holder H4 to hold the fourth lens group IV of the rear group RG are held by a common member in contact with the lens-group holders H2 and H4.

—Aspect 11—

In the projection apparatus PD (FIG. 17, and Example 5 of the lens holding device HD) according to Aspect 10, the common member to contact and hold the lens-group holder H2 to hold the second lens group II and the lens-group holder H4 to hold the fourth lens group IV is a rotary barrel RT1.

—Aspect 12—

In the projection apparatus PD (FIGS. 13 through 16, and FIG. 18, and Examples 1 through 4, and 6 of the lens holding device HD) according to Aspect 10, the common member to contact and hold the lens-group holder H2 and the lens-group holder H4 reduces the first lens group I through the third lens group III from rotating.

—Aspect 13—

In the projection apparatus PD (FIGS. 13 through 15, and FIG. 18, and Examples 1 through 3, and 6 of the lens holding device HD) according to Aspect 12, the common member to contact and hold the lens-group holder H2 and the lens-group holder H4 is a straight barrel ST and ST4.

—Aspect 14—

In the projection apparatus PD (FIG. 16, and Example 4 of the lens holding device HD) according to Aspect 12, the common member to contact and hold the lens-group holder H2 and the lens-group holder H4 is a plurality of pins P1 and P2.

—Aspect 15—

In the projection apparatus PD (FIG. 15, and Example 3 of the lens holding device HD) according to Aspect 12, the common member to contact and hold the lens-group holder H2 and the lens-group holder H4 is a straight barrel ST4. The lens-group holder H4 is a part of the straight barrel ST4.

—Aspect 16—

In the projection apparatus PD (FIGS. 13 through 18, and Examples 1 through 6 of the lens holding device HD) according to any one of Aspects 10 through 15, the lens holding device HD holds the fifth lens group V to move along the direction of the optical axis (the A axis).

—Aspect 17—

In the projection apparatus PD (FIGS. 13 through 18, and Examples 1 through 6 of the lens holding device HD) according to Aspect 16, the lens holding device HD includes a helicoid HL on the straight barrel ST, ST1, ST4, and ST5, and the lens-group holder H5.

—Aspect 18—

In the projection apparatus PD (FIGS. 13 through 17, and Examples 1 through 6 of the lens holding device HD) according to any one of Aspects 10 through 17, the lens holding device HD holds the fifth lens group V to move around the optical axis (the A axis).

A projection system PS according to the present disclosure is achieved as described below.

—Aspect 19—

A projection system PS includes the projection apparatus PD according to any one of Aspects 9 through 18 and a screen SC as the projection surface. The projection system PS satisfies conditional formula (3):

$$TR<0.30, \qquad (3)$$

where TR is a ratio of the distance L from a point of the refractive optical element 13 having a power intersecting with the optical axis (A axis) of the refractive optical system 11 to the screen SC in a direction perpendicular to the screen SC, with respect to the width W of the screen SC. That is, TR is a ratio of the distance L to the width W.

In Examples 1 through 6 described above, the first lens group I through the fourth lens group IV are held by the common member (the straight barrel ST and ST4, the pins P1 and P2, and the rotary barrel RT1) in contact with the first lens group I through the fourth lens group IV.

The straight barrel ST and ST4, the pins P1 and P2, and the rotary barrel RT eliminates or reduces the eccentricity of the first lens group I through the fourth lens group IV.

As described referring to FIG. 5, in the refractive optical system 11 illustrated in FIGS. 3 and 4, particularly the fourth lens group IV having a positive refractive power and the second lens group II having a negative refractive power within the focusing group have high sensitivity of eccentricity.

Accordingly, with the second lens group II and the fourth lens group IV having high sensitivity of eccentricity in contact with and held by the common member, the relative eccentricity of the second lens group II and the fourth lens group IV is effectively reduced.

Therefore, the common member, such as the straight barrel ST or ST4, the plurality of pins P1 and P2, and the rotary barrel RT1, contacts and hold the second lens group II and the fourth lens group IV, and another member, which is different from the common member, may hold the first lens group I and the third lens group III.

As in Examples 1 through 3, and 6 of the lens holding device HD, with the focusing group in contact with and held by the straight barrel ST or ST4, an increase in parts and complexity of the configuration is prevented, allowing a reduction in size of lens barrel.

As in Example of 4 of the lens holding device HD, the lens-group holders H2 and H4 are in contact with and held by the pins P1 and P2, thereby more highly reducing the eccentricity of the second lens group II and the fourth lens group IV.

As in Example 3 of the lens holding device HD, the fourth lens group IV is integrated into the straight barrel ST4, thereby reducing the accumulation of assembly error, eliminating or reducing the eccentricity of the second lens group II and the fourth lens group IV and simplifying the lens holding device HD, thus reducing the size of the lens holding device HD.

It is to be noted that, with a configuration that moves the image display element SE along the A axis relative to the lens at a position closest to the image display element SE in the fifth lens group V, the movement of the image display element SE can adjust the back focus. With such a configuration, the accuracy of adjustment of back focus is increased as compared to the cases in Examples 1 through 6 of the lens holding device HD.

Although the embodiments of the present disclosure have been described above, the present disclosure is not limited to the embodiments described above, and a variety of modifications can naturally be made within the scope of the present disclosure.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A projection optical system, comprising:
    a reflective optical system on a magnification side along an optical path of the projection optical system, the reflective optical system including at least one reflective optical element having a power; and
    a refractive optical system on a reduction side along the optical path, the refractive optical system including:
        a front group on the magnification side; and
        a rear group on the reduction side having a positive refractive power,
    wherein the front group includes a plurality of focusing lens groups that move to at least one of the magnification side and the reduction side in a change in focus from a long distance to a short distance,
    the plurality of focusing lens groups include a first focusing lens group closest to the magnification side, a second focusing lens group second closest to the magnification side in the focusing lens group, and a third focusing lens group third closest to the magnification side,
    a distance between the front group and the rear group varies in the change in focus from the long distance to the short distance, and
    the rear group of the refractive optical system is fixed during the change in focus.

2. The projection optical system according to claim 1, wherein a first amount of movement of the first focusing lens group is different from a second amount of movement of the second focusing lens group in the change in focus from the long distance to the short distance.

3. The projection optical system according to claim 1, wherein the first focusing lens group has a positive refractive power.

4. The projection optical system according to claim 1, wherein the first focusing lens group moves to the magnification side in the change in focus from the long distance to the short distance.

5. The projection optical system according to claim 1, wherein the second focusing lens group has a negative refractive power.

6. The projection optical system according to claim 1, wherein the third focusing lens group has a positive refractive power.

7. A projection optical system, comprising:
    a reflective optical system on a magnification side along an optical path of the projection optical system, the reflective optical system including at least one reflective optical element having a power; and a refractive optical system on a reduction side along the optical path, the refractive optical system including:
a front group on the magnification side; and
a rear group on the reduction side having a positive refractive power,
wherein the front group includes three focusing lens groups that move to at least one of the magnification side and the reduction side in a change in focus from a long distance to a short distance,
the three focusing lens groups include a first focusing lens group closest to the magnification side, a second focusing lens group, and a third focusing lens group third closest to the magnification side,
a distance between the front group and the rear group varies in the change in focus from the long distance to the short distance, and
the rear group of the refractive optical system is fixed during the change in focus.

8. The projection optical system according to claim 7, wherein the first focusing lens group has a positive refractive power.

9. The projection optical system according to claim 7, wherein the first focusing lens group moves to the magnification side in the change in focus from the long distance to the short distance.

10. The projection optical system according to claim 9, wherein the second focusing lens group has a negative refractive power.

11. The projection optical system according to claim 1, wherein $-0.20<F2/F3<-0.5,$ F2 is a focal length of the second focusing lens group in the front group of the refractive optical system, and F3 is a focal length of the third focusing lens group in the front group of the refractive optical system.

12. The projection optical system according to claim 1, wherein each of the first focusing lens group and the third focusing lens group in the front group of the refractive optical system consists of a single lens.

13. The projection optical system according to claim 1, wherein the rear group of the refractive optical system includes a plurality of lenses,
the plurality of lenses are divided into two lens groups at a point with a greatest difference in outer diameter between adjacent lenses, and
one lens of the adjacent lenses disposed on the magnification side has a greater outer diameter than another lens of the adjacent lenses.

14. The projection optical system according to claim 13, wherein the two lens groups are a fourth lens group on the magnification side and a fifth lens group on the reduction side.

15. The projection optical system according to claim 1, wherein the at least one reflective optical element having the power in the reflective optical system is a concave mirror with a free-form surface.

16. The projection optical system according to claim 1, wherein $10<F1/FL<80,$

FL is a focal length of the refractive optical system, and
F1 is a focal length of the first focusing lens group when the image enlarged and projected onto the projection surface is largest.

* * * * *